(12) United States Patent
Kruzel

(10) Patent No.: US 12,434,252 B2
(45) Date of Patent: Oct. 7, 2025

(54) FULL-CIRCLE AND PART-CIRCLE ROTOR SPRINKLER

(71) Applicant: Rain Bird Corporation, Azusa, CA (US)

(72) Inventor: Mateusz Grzegorz Kruzel, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 743 days.

(21) Appl. No.: 17/724,993

(22) Filed: Apr. 20, 2022

(65) Prior Publication Data

US 2023/0338972 A1   Oct. 26, 2023

(51) Int. Cl.
*B05B 3/04* (2006.01)
*A01G 25/02* (2006.01)

(52) U.S. Cl.
CPC ............ *B05B 3/0431* (2013.01); *A01G 25/02* (2013.01)

(58) Field of Classification Search
CPC ..... B05B 3/0431; B05B 3/021; B05B 3/0486; B05B 3/0454; B05B 3/0477; B05B 1/262; B05B 1/265; B05B 1/304; B05B 1/267; B05B 15/74; A01G 25/02; A01G 25/00
See application file for complete search history.

(56) References Cited

U.S. PATENT DOCUMENTS

| | | |
|---|---|---|
| 2,187,549 A | 1/1940 | Thompson |
| 2,268,855 A | 1/1942 | Brooks |
| 2,625,411 A | 1/1953 | Unger |
| 2,721,052 A | 10/1955 | Richmond |
| 2,950,132 A | 8/1960 | Kocsuta |
| 2,999,701 A | 9/1961 | Blair |
| 3,091,399 A | 5/1963 | Kennedy |
| 3,095,148 A | 6/1963 | Smith |
| 3,107,056 A | 10/1963 | Hunter |
| 3,135,259 A | 6/1964 | Evans |
| 3,204,988 A | 9/1965 | Dunton |
| 3,244,373 A | 4/1966 | Hait |
| 3,263,930 A | 8/1966 | Anton |
| 3,334,817 A | 8/1967 | Cecil |
| 3,521,822 A | 7/1970 | Friedmann |

(Continued)

FOREIGN PATENT DOCUMENTS

| | | |
|---|---|---|
| EP | 1818104 A1 | 8/2007 |
| EP | 1864717 | 12/2007 |

(Continued)

OTHER PUBLICATIONS

International Search Report, International Patent Application No. PCT/US2013/050072, dated Nov. 7, 2013, 2 pages.

(Continued)

*Primary Examiner* — Christopher R Dandridge

(74) *Attorney, Agent, or Firm* — Fitch, Even, Tabin & Flannery, LLP

(57) ABSTRACT

A rotor sprinkler is provided that includes a housing having a riser assembly and a rotatable nozzle turret on an upper end of the riser assembly. The rotor sprinkler includes an arc setting assembly that enables part-circle operation of the turret and a selector assembly that permits selection of either part-circle or full-circle mode of the nozzle turret where the full-circle mode rotates in one direction regardless of the direction last set in part-circle mode.

13 Claims, 14 Drawing Sheets

(56) References Cited

U.S. PATENT DOCUMENTS

| | | |
|---|---|---|
| 3,523,647 A | 8/1970 | Radecki |
| 3,645,451 A | 2/1972 | Hauser |
| 3,655,132 A | 4/1972 | Rosic |
| 3,782,638 A | 1/1974 | Bumpstead |
| 3,921,912 A | 11/1975 | Hayes |
| 3,934,820 A | 1/1976 | Phaup |
| 4,059,227 A | 11/1977 | Hunter |
| 4,091,997 A | 5/1978 | Ridgway |
| 4,119,275 A | 10/1978 | Hunter |
| 4,149,358 A | 4/1979 | Comer |
| 4,198,000 A | 4/1980 | Hunter |
| 4,204,642 A | 5/1980 | Hunter |
| 4,220,283 A | 9/1980 | Citron |
| 4,265,404 A | 5/1981 | Hunter |
| 4,272,024 A | 6/1981 | Kah |
| 4,301,967 A | 11/1981 | Hunter |
| 4,398,666 A | 8/1983 | Hunter |
| 4,406,440 A | 9/1983 | Kulle |
| 4,417,691 A | 11/1983 | Lockwood |
| 4,451,635 A | 5/1984 | Gould |
| 4,471,908 A | 9/1984 | Hunter |
| 4,498,626 A | 2/1985 | Pitchford |
| 4,501,391 A | 2/1985 | Hunter |
| 4,559,653 A | 12/1985 | Mathews |
| 4,569,485 A | 2/1986 | Walto |
| 4,624,412 A | 11/1986 | Hunter |
| 4,625,914 A | 12/1986 | Sexton |
| 4,634,052 A | 1/1987 | Grizzle |
| 4,635,975 A | 1/1987 | Campbell |
| 4,637,636 A | 1/1987 | Guest |
| 4,650,118 A | 3/1987 | Saarem |
| 4,681,259 A | 7/1987 | Troup |
| 4,682,755 A | 7/1987 | Bernstein |
| 4,702,417 A | 10/1987 | Hartley |
| 4,708,290 A | 11/1987 | Osmond |
| 4,708,291 A | 11/1987 | Grundy |
| 4,718,605 A | 1/1988 | Hunter |
| 4,732,861 A | 3/1988 | Sinclair |
| 4,773,595 A | 9/1988 | Livne |
| 4,784,325 A | 11/1988 | Walker |
| 4,787,558 A | 11/1988 | Sexton |
| 4,819,875 A | 4/1989 | Beal |
| 4,867,378 A | 9/1989 | Kah |
| 4,867,379 A | 9/1989 | Hunter |
| 4,892,252 A | 1/1990 | Bruninga |
| 4,898,332 A | 2/1990 | Hunter |
| 4,901,924 A | 2/1990 | Kah |
| 4,919,337 A | 4/1990 | Van Leeuwen |
| 4,925,098 A | 5/1990 | Di Paola |
| 4,955,542 A | 9/1990 | Kah |
| 4,961,534 A | 10/1990 | Tyler |
| 4,967,961 A | 11/1990 | Hunter |
| 4,971,256 A | 11/1990 | Malcolm |
| 4,972,993 A | 11/1990 | Van Leeuwen |
| 5,009,368 A | 4/1991 | Streck |
| 5,031,833 A | 7/1991 | Alkalay |
| 5,031,840 A | 7/1991 | Grundy |
| 5,048,757 A | 9/1991 | Van Leeuwen |
| 5,050,800 A | 9/1991 | Lamar |
| 5,052,621 A | 10/1991 | Katzer |
| 5,097,861 A | 3/1992 | Hopkins |
| 5,098,021 A | 3/1992 | Kah |
| 5,115,977 A | 5/1992 | Alkalay |
| 5,148,990 A | 9/1992 | Kah |
| 5,148,991 A | 9/1992 | Kah |
| 5,158,232 A | 10/1992 | Tyler |
| 5,174,501 A | 12/1992 | Hadar |
| 5,226,602 A | 7/1993 | Cochran |
| 5,239,587 A | 8/1993 | Muckelrath |
| 5,251,938 A | 10/1993 | Erickson |
| 5,259,587 A | 11/1993 | D'Alessio |
| 5,288,023 A | 2/1994 | Han |
| 5,291,842 A | 3/1994 | Sallstrom |
| 5,330,103 A | 7/1994 | Eckstein |
| 5,360,167 A | 11/1994 | Grundy |
| 5,375,768 A | 12/1994 | Clark |
| 5,383,600 A * | 1/1995 | Verbera ................. B05B 3/0431 239/206 |
| 5,385,600 A | 1/1995 | Jounela |
| 5,394,678 A | 3/1995 | Lonn |
| 5,417,370 A | 5/1995 | Kah |
| 5,444,611 A | 8/1995 | Woytowitz |
| RE35,037 E | 9/1995 | Kah |
| 5,456,411 A | 10/1995 | Scott |
| 5,462,251 A | 10/1995 | Kawabe |
| 5,473,961 A | 12/1995 | Jackson |
| 5,487,572 A | 1/1996 | Combot-Courrau |
| 5,526,982 A | 6/1996 | McKenzie |
| 5,527,073 A | 6/1996 | Readman |
| 5,556,036 A | 9/1996 | Chase |
| 5,588,594 A | 12/1996 | Kah |
| 5,611,488 A | 3/1997 | Frolich |
| 5,630,551 A | 5/1997 | Forcier |
| 5,641,122 A | 6/1997 | Alkalai |
| 5,653,390 A | 8/1997 | Kah |
| 5,673,855 A | 10/1997 | Nguyen |
| 5,676,315 A | 10/1997 | Han |
| 5,681,062 A | 10/1997 | Fukao |
| 5,685,486 A | 11/1997 | Spenser |
| D388,502 S | 12/1997 | Kah |
| 5,695,122 A | 12/1997 | Messinger |
| 5,695,123 A | 12/1997 | Van Le |
| 5,695,224 A | 12/1997 | Grenier |
| 5,699,962 A | 12/1997 | Scott |
| 5,709,417 A | 1/1998 | Verbeck |
| 5,722,593 A | 3/1998 | McKenzie |
| 5,758,827 A | 6/1998 | Van Le |
| 5,762,270 A | 6/1998 | Kearby |
| 5,765,757 A | 6/1998 | Bendall |
| 5,816,627 A | 10/1998 | Readman |
| 5,823,440 A | 10/1998 | Clark |
| 5,826,797 A | 10/1998 | Kah |
| 5,868,316 A | 2/1999 | Scott |
| 5,899,386 A | 5/1999 | Miyasato |
| 5,911,443 A | 6/1999 | Le Quere |
| 5,938,122 A | 8/1999 | Heren |
| 5,975,430 A | 11/1999 | Larsen |
| 5,992,760 A | 11/1999 | Kearby |
| 6,000,632 A | 12/1999 | Wallace |
| 6,029,907 A | 2/2000 | McKenzie |
| 6,039,268 A | 3/2000 | Grundy |
| 6,042,021 A | 3/2000 | Clark |
| 6,050,502 A | 4/2000 | Clark |
| 6,085,995 A | 7/2000 | Kah |
| 6,109,545 A | 8/2000 | Kah |
| 6,109,664 A | 8/2000 | Guest |
| 6,138,924 A | 10/2000 | Hunter |
| 6,155,493 A | 12/2000 | Kearby |
| 6,168,577 B1 | 1/2001 | Niederjohn |
| 6,182,909 B1 | 2/2001 | Kah |
| 6,209,801 B1 | 4/2001 | Kearby |
| 6,227,455 B1 | 5/2001 | Scott |
| 6,231,090 B1 | 5/2001 | Fukao |
| 6,237,862 B1 | 5/2001 | Kah |
| 6,241,158 B1 | 6/2001 | Clark |
| 6,244,521 B1 | 6/2001 | Sesser |
| 6,293,147 B1 | 9/2001 | Parker |
| 6,336,597 B1 | 1/2002 | Kah |
| 6,351,929 B1 | 3/2002 | Gust |
| 6,364,217 B1 | 4/2002 | Lockwood |
| D458,554 S | 6/2002 | Jolly |
| 6,464,151 B1 | 10/2002 | Cordua |
| 6,478,237 B2 | 11/2002 | Kearby |
| 6,488,401 B1 | 12/2002 | Seaman |
| 6,491,235 B1 | 12/2002 | Scott |
| 6,494,384 B1 | 12/2002 | Meyer |
| 6,499,672 B1 | 12/2002 | Sesser |
| 6,568,608 B2 | 5/2003 | Sirkin |
| 6,601,781 B2 | 8/2003 | Kah |
| 6,607,147 B2 | 8/2003 | Schneider |
| 6,612,623 B2 | 9/2003 | Salomon-Bahls |
| 6,637,672 B2 | 10/2003 | Cordua |
| 6,651,905 B2 | 11/2003 | Sesser |
| 6,655,830 B1 | 12/2003 | Seaman |

(56) References Cited

U.S. PATENT DOCUMENTS

| | | |
|---|---|---|
| 6,663,145 B1 | 12/2003 | Lyall |
| 6,695,223 B2 | 2/2004 | Beutler |
| 6,712,796 B2 | 3/2004 | Fentis |
| 6,721,630 B1 | 4/2004 | Woytowitz |
| 6,722,629 B1 | 4/2004 | Nakazawa |
| 6,732,950 B2 | 5/2004 | Ingham, Jr. |
| 6,732,952 B2 | 5/2004 | Kah |
| 6,736,332 B2 | 5/2004 | Sesser |
| 6,799,732 B2 | 10/2004 | Sirkin |
| 6,802,458 B2 | 10/2004 | Gregory |
| 6,814,305 B2 | 11/2004 | Townsend |
| 6,817,543 B2 | 11/2004 | Clark |
| 6,824,172 B1 | 11/2004 | Komolrochanaporn |
| 6,827,291 B2 | 12/2004 | Townsend |
| 6,834,816 B2 | 12/2004 | Kah, Jr. |
| 6,840,460 B2 | 1/2005 | Clark |
| 6,842,667 B2 | 1/2005 | Beutler |
| 6,848,124 B2 | 2/2005 | Goettl |
| 6,848,632 B2 | 2/2005 | Clark |
| 6,854,664 B2 | 2/2005 | Smith |
| 6,869,026 B2 | 3/2005 | McKenzie |
| 6,871,795 B2 | 3/2005 | Anuskiewicz |
| 6,883,727 B2 | 4/2005 | De Los Santos |
| 6,896,881 B1 | 5/2005 | Russell |
| 6,899,355 B2 | 5/2005 | Klein |
| 6,913,292 B2 | 7/2005 | Snyder, Sr. |
| 6,921,029 B2 | 7/2005 | Lockwood |
| 6,929,236 B1 | 8/2005 | Height |
| 6,942,164 B2 | 9/2005 | Walker |
| 6,945,471 B2 | 9/2005 | McKenzie |
| 6,957,782 B2 | 10/2005 | Clark |
| 6,988,747 B2 | 1/2006 | Allen |
| 6,991,362 B1 | 1/2006 | Seaman |
| 7,010,394 B1 | 3/2006 | Runge |
| 7,017,831 B2 | 3/2006 | Santiago |
| 7,028,920 B2 | 4/2006 | Hekman |
| 7,032,836 B2 | 4/2006 | Sesser |
| 7,032,844 B2 | 4/2006 | Cordua |
| 7,040,553 B2 | 5/2006 | Clark |
| 7,044,403 B2 | 5/2006 | Kah |
| 7,090,146 B1 | 8/2006 | Ericksen |
| 7,111,875 B2 | 9/2006 | Ball |
| 7,121,593 B2 | 10/2006 | Snyder, Sr. |
| 7,133,749 B2 | 11/2006 | Goldberg |
| 7,134,613 B2 | 11/2006 | Kah |
| 7,143,692 B2 | 12/2006 | Schmitt |
| 7,143,962 B2 | 12/2006 | Kah, Jr. |
| 7,152,814 B1 | 12/2006 | Schapper |
| 7,159,795 B2 | 1/2007 | Sesser |
| 7,168,632 B2 | 1/2007 | Kates |
| 7,191,958 B1 | 3/2007 | Wang |
| 7,195,287 B2 | 3/2007 | Wai |
| 7,225,057 B2 | 5/2007 | Froman |
| 7,226,003 B2 | 6/2007 | Kah |
| 7,232,078 B2 | 6/2007 | Kah, Jr. |
| 7,232,081 B2 | 6/2007 | Kah |
| 7,234,651 B2 | 6/2007 | Mousavi |
| 7,255,291 B1 | 8/2007 | Lo |
| 7,287,711 B2 | 10/2007 | Crooks |
| 7,287,712 B2 | 10/2007 | Kah |
| 7,322,533 B2 | 1/2008 | Grizzle |
| 7,325,753 B2 | 2/2008 | Gregory |
| 7,337,988 B2 | 3/2008 | McCormick |
| 7,363,113 B2 | 4/2008 | Runge |
| RE40,440 E | 7/2008 | Sesser |
| 7,392,936 B1 | 7/2008 | Green |
| 7,392,956 B2 | 7/2008 | McKenzie |
| 7,404,525 B2 | 7/2008 | Santiago |
| 7,412,303 B1 | 8/2008 | Porter |
| 7,422,162 B2 | 9/2008 | Wang |
| 7,422,752 B2 | 9/2008 | Hirst |
| 7,429,005 B2 | 9/2008 | Schapper |
| 7,472,840 B2 | 1/2009 | Gregory |
| 7,478,526 B2 | 1/2009 | Mcafee |
| 7,500,619 B2 | 3/2009 | Lockwood |
| 7,500,620 B2 | 3/2009 | Cordua |
| 7,500,699 B2 | 3/2009 | Snyder, Sr. |
| 7,530,606 B1 | 5/2009 | Yang |
| 7,552,632 B2 | 6/2009 | Runge |
| 7,574,284 B2 | 8/2009 | Goldberg |
| 7,578,010 B2 | 8/2009 | Goettl |
| 7,581,687 B2 | 9/2009 | Feith |
| 7,584,023 B1 | 9/2009 | Palmer |
| 7,590,471 B2 | 9/2009 | Jacobsen |
| 7,597,273 B2 | 10/2009 | McAfee |
| 7,611,077 B2 | 11/2009 | Sesser |
| 7,621,464 B2 | 11/2009 | Smith |
| 7,621,467 B1 | 11/2009 | Garcia |
| 7,624,934 B2 | 12/2009 | Breedlove |
| 7,629,590 B2 | 12/2009 | Horsky |
| 7,644,870 B2 | 1/2010 | Alexander |
| 7,677,469 B1 | 3/2010 | Clark |
| 7,686,236 B2 | 3/2010 | Alexander |
| 7,703,706 B2 | 4/2010 | Walker |
| 7,717,475 B2 | 5/2010 | Savelle |
| 7,748,646 B2 | 7/2010 | Clark |
| 7,761,189 B2 | 7/2010 | Froman |
| 7,766,259 B2 | 8/2010 | Feith |
| 7,766,396 B1 | 8/2010 | Elbaz |
| 7,793,868 B2 | 9/2010 | Kah |
| 7,820,981 B2 | 10/2010 | Horsky |
| 7,823,804 B2 | 11/2010 | Cordua |
| 7,828,229 B2 | 11/2010 | Kah |
| 7,828,230 B1 | 11/2010 | Anuskiewicz |
| 7,834,816 B2 | 11/2010 | Marino |
| 7,841,547 B2 | 11/2010 | Kah |
| 7,850,094 B2 | 12/2010 | Richmond |
| 7,853,363 B1 | 12/2010 | Porter |
| 7,861,948 B1 | 1/2011 | Crooks |
| 7,862,089 B2 | 1/2011 | Crompton |
| 7,877,168 B1 | 1/2011 | Porter |
| 7,912,588 B2 | 3/2011 | Runge |
| 7,917,249 B2 | 3/2011 | Jacobsen |
| 7,942,161 B2 | 5/2011 | Crompton |
| 7,962,245 B2 | 6/2011 | Runge |
| RE42,596 E | 8/2011 | Sesser |
| 7,988,071 B2 | 8/2011 | Bredberg |
| 8,006,919 B2 | 8/2011 | Renquist |
| 8,020,788 B2 | 9/2011 | Luettgen |
| 8,025,315 B2 | 9/2011 | Schreckenberg |
| 8,033,578 B2 | 10/2011 | De Wilde |
| 8,047,456 B2 | 11/2011 | Kah |
| 8,074,456 B2 | 12/2011 | Shah |
| 8,074,897 B2 | 12/2011 | Hunnicutt |
| 8,113,443 B2 | 2/2012 | Zur |
| 8,136,742 B2 | 3/2012 | Cordua |
| 8,136,743 B2 | 3/2012 | Kah |
| 8,205,915 B1 | 6/2012 | Crompton |
| 8,272,578 B1 | 9/2012 | Clark |
| 8,297,533 B2 | 10/2012 | Dunn |
| 8,313,043 B1 | 11/2012 | Crooks |
| 8,469,288 B1 | 6/2013 | Clark |
| 8,474,733 B1 | 7/2013 | Clark |
| 8,628,027 B2 | 1/2014 | Kah |
| 8,636,229 B1 | 1/2014 | Clark |
| 8,636,230 B1 | 1/2014 | Clark |
| 8,636,233 B2 | 1/2014 | Clark |
| 8,727,238 B1 | 5/2014 | Clark |
| 8,777,124 B2 | 7/2014 | Clark |
| 8,939,384 B1 | 1/2015 | Anuskiewicz |
| 8,955,767 B1 | 2/2015 | Clark |
| 8,955,768 B1 | 2/2015 | Clark |
| 8,991,725 B2 | 3/2015 | Kah |
| 8,991,726 B2 | 3/2015 | Kah, Jr. |
| 8,991,730 B2 | 3/2015 | Kah, Jr. |
| 9,120,111 B2 | 9/2015 | Nations |
| 9,156,043 B2 | 10/2015 | Walker |
| 9,162,239 B2 | 10/2015 | Renner |
| 9,205,435 B1 | 12/2015 | Clark |
| 9,446,421 B1 | 9/2016 | Anuskiewicz |
| 9,511,387 B2 | 12/2016 | Keren |
| 9,616,437 B2 | 4/2017 | Onofrio |
| 10,029,265 B2 | 7/2018 | Bell |
| 10,099,231 B2 | 10/2018 | Clark |

(56) References Cited

U.S. PATENT DOCUMENTS

| | | |
|---|---|---|
| 10,464,083 B2 | 11/2019 | Onofrio |
| 10,717,093 B2 | 7/2020 | Bell |
| 10,786,823 B2 | 9/2020 | Clark |
| 11,040,359 B2 | 6/2021 | Simmons |
| 11,090,671 B2 | 8/2021 | Zimmerman |
| 11,684,939 B2 | 6/2023 | Wright, III |
| 11,779,948 B2 | 10/2023 | Renquist |
| 12,036,569 B2 | 7/2024 | Zimmerman |
| 2001/0013557 A1 | 8/2001 | Kah |
| 2002/0023972 A1 | 2/2002 | Kah |
| 2002/0074432 A1 | 6/2002 | Kah |
| 2002/0089175 A1 | 7/2002 | Ericksen |
| 2002/0130202 A1 | 9/2002 | Kah |
| 2002/0135184 A1 | 9/2002 | Snyder |
| 2002/0158145 A1 | 10/2002 | Schneider |
| 2003/0006306 A1 | 1/2003 | Clark |
| 2003/0006307 A1 | 1/2003 | Clark |
| 2003/0010842 A1 | 1/2003 | Kah |
| 2003/0075620 A1 | 4/2003 | Kah, Jr. |
| 2003/0089796 A1 | 5/2003 | Kah |
| 2003/0124704 A1 | 7/2003 | Strittmatter |
| 2003/0155433 A1 | 8/2003 | Gregory |
| 2004/0014053 A1 | 1/2004 | Zerhusen |
| 2004/0050958 A1 | 3/2004 | McKenzie |
| 2004/0108392 A1 | 6/2004 | Kah |
| 2004/0164178 A1 | 8/2004 | Carl |
| 2004/0195358 A1 | 10/2004 | Santiago |
| 2004/0195400 A1 | 10/2004 | Anuskiewicz |
| 2004/0239115 A1 | 12/2004 | Wilk |
| 2004/0241703 A1 | 12/2004 | Desauvage |
| 2005/0009105 A1 | 1/2005 | Goddard |
| 2005/0042216 A1 | 2/2005 | Frantz |
| 2005/0054576 A1 | 3/2005 | Siler-Khodr |
| 2005/0103887 A1 | 5/2005 | McCormick |
| 2005/0103901 A1 | 5/2005 | Kah |
| 2005/0133619 A1 | 6/2005 | Clark |
| 2005/0146133 A1 | 7/2005 | Snyder |
| 2005/0161534 A1 | 7/2005 | Kah |
| 2005/0173557 A1 | 8/2005 | Kah |
| 2005/0194461 A1 | 9/2005 | Goldberg |
| 2005/0194464 A1 | 9/2005 | Bruninga |
| 2005/0214218 A1 | 9/2005 | Russell |
| 2005/0233448 A1 | 10/2005 | Oh |
| 2006/0049275 A1 | 3/2006 | Santiago |
| 2006/0184284 A1 | 8/2006 | Froman |
| 2006/0219815 A1 | 10/2006 | Hekman |
| 2006/0265852 A1 | 11/2006 | Snyder |
| 2006/0273196 A1 | 12/2006 | Crooks |
| 2006/0278727 A1 | 12/2006 | Kah |
| 2007/0034712 A1 | 2/2007 | Kah |
| 2007/0075542 A1 | 4/2007 | Glaze |
| 2007/0119975 A1 | 5/2007 | Hunnicutt |
| 2007/0119976 A1 | 5/2007 | Kah |
| 2007/0119978 A1 | 5/2007 | Wang |
| 2007/0128315 A1 | 6/2007 | Szydlowski |
| 2007/0131802 A1 | 6/2007 | Kah |
| 2007/0235565 A1 | 10/2007 | Kah |
| 2008/0034859 A1 | 2/2008 | Runge |
| 2008/0054092 A1 | 3/2008 | Alexander |
| 2008/0087743 A1 | 4/2008 | Govrin |
| 2008/0128531 A1 | 6/2008 | Kah |
| 2008/0142618 A1 | 6/2008 | Smith |
| 2008/0257982 A1 | 10/2008 | Kah |
| 2008/0308650 A1 | 12/2008 | Clark |
| 2009/0053226 A1 | 2/2009 | Crowley |
| 2009/0065606 A1 | 3/2009 | Lee |
| 2009/0072048 A1 | 3/2009 | Renquist |
| 2009/0130315 A1 | 5/2009 | Vogel |
| 2009/0173803 A1 | 7/2009 | Kah |
| 2009/0173804 A1 | 7/2009 | Kah |
| 2009/0177330 A1 | 7/2009 | Carl |
| 2009/0188988 A1 | 7/2009 | Walker |
| 2009/0278556 A1 | 11/2009 | Man |
| 2010/0029053 A1 | 2/2010 | Itokawa |
| 2010/0090024 A1 | 4/2010 | Hunnicutt |
| 2010/0098632 A1 | 4/2010 | Russell |
| 2010/0105865 A1 | 4/2010 | Telford |
| 2010/0108787 A1 | 5/2010 | Walker |
| 2010/0176217 A1* | 7/2010 | Richmond .............. B05B 15/74 239/205 |
| 2010/0179310 A1 | 7/2010 | Kamme |
| 2010/0187331 A1 | 7/2010 | Clark |
| 2010/0236936 A1 | 9/2010 | Brunner |
| 2010/0243762 A1 | 9/2010 | Onofrio |
| 2010/0244438 A1 | 9/2010 | Johanson |
| 2010/0276512 A1 | 11/2010 | Nies |
| 2010/0301135 A1 | 12/2010 | Hunnicutt |
| 2010/0301142 A1 | 12/2010 | Hunnicutt |
| 2010/0327083 A1 | 12/2010 | Kah |
| 2011/0017842 A1 | 1/2011 | Nations |
| 2011/0036933 A1 | 2/2011 | Kah |
| 2011/0036993 A1 | 2/2011 | Mano |
| 2011/0043607 A1 | 2/2011 | Grier |
| 2011/0045005 A1 | 2/2011 | Crowley |
| 2011/0049875 A1 | 3/2011 | Stults |
| 2011/0057048 A1 | 3/2011 | McAfee |
| 2011/0084151 A1 | 4/2011 | Dunn |
| 2011/0095521 A1 | 4/2011 | Crompton |
| 2011/0108637 A1 | 5/2011 | Kah |
| 2011/0114569 A1 | 5/2011 | Kim |
| 2011/0121092 A1 | 5/2011 | Scully |
| 2011/0121097 A1 | 5/2011 | Walker |
| 2011/0238228 A1 | 9/2011 | Woytowitz |
| 2011/0239310 A1 | 9/2011 | Cheng |
| 2011/0248094 A1 | 10/2011 | Robertson |
| 2011/0248097 A1 | 10/2011 | Kim |
| 2011/0306169 A1 | 12/2011 | Ye |
| 2011/0309161 A1 | 12/2011 | Renquist |
| 2011/0309169 A1 | 12/2011 | Kah |
| 2012/0012670 A1 | 1/2012 | Kah |
| 2012/0041606 A1 | 2/2012 | Standerfer |
| 2012/0043398 A1 | 2/2012 | Clark |
| 2012/0061489 A1 | 3/2012 | Hunnicutt |
| 2012/0085840 A1 | 4/2012 | Marino |
| 2012/0118998 A1 | 5/2012 | Drechsel |
| 2012/0138832 A1 | 6/2012 | Townsend |
| 2012/0234940 A1 | 9/2012 | Clark |
| 2013/0015273 A1 | 1/2013 | Onofrio |
| 2013/0221128 A1 | 8/2013 | Nations |
| 2014/0014738 A1 | 1/2014 | Walker |
| 2014/0263735 A1 | 9/2014 | Nations |
| 2019/0076858 A1 | 3/2019 | Clark |
| 2021/0162449 A1 | 6/2021 | McAfee |
| 2021/0316325 A1 | 10/2021 | Peleg |
| 2021/0346902 A1 | 11/2021 | Zimmerman |
| 2022/0297140 A1 | 9/2022 | McAfee |
| 2023/0286003 A1 | 9/2023 | Wright, III |

FOREIGN PATENT DOCUMENTS

| | | |
|---|---|---|
| EP | 2206560 A1 | 7/2010 |
| EP | 1492626 B1 | 12/2011 |
| WO | 03086643 A1 | 10/2003 |
| WO | 2004113777 | 12/2004 |
| WO | 2009152980 | 12/2009 |
| WO | 2011002928 A1 | 1/2011 |
| WO | 2014011877 | 1/2014 |

OTHER PUBLICATIONS

U.S. Appl. No. 61/602,948, filed Feb. 24, 2012 and entitled Arc Adjustable Rotary Sprinkler Having Full-Circle Operation and Automatic Matched Precipitation.
U.S. Appl. No. 61/790,142, filed Mar. 15, 2013 and entitled Matched Precipitation Rate Rotary Sprinkler.
U.S. Appl. No. 63/161,843, filed Mar. 16, 2021 and entitled Multi-Mode Rotor Sprinkler Apparatus and Method.
U.S. Appl. No. 13/776,044; Notice of Allowance mailed Apr. 23, 2015.
U.S. Appl. No. 14/209,910; Office Action mailed Dec. 16, 2015.
U.S. Appl. No. 17/694,948; Non-Final Rejection mailed Oct. 25, 2024 (pp. 1-14).

(56) References Cited

OTHER PUBLICATIONS

Machine Translation of EP-1864717-A2 Description, Oct. 2024, Espacenet, pp. 1-9 (Year: 2024).
U.S. Appl. No. 17/694,948; Notice of Allowance and Fees Due (PTOL-85) mailed Apr. 28, 2025; (pp. 1-9).
U.S. Appl. No. 17/694,948; Notice of Allowance and Fees Due (PTOL-85) mailed May 20, 2025; (pp. 1-9).

* cited by examiner

FULL-CIRCLE AND PART-CIRCLE ROTOR SPRINKLER

FIELD

The field relates to rotor sprinklers, and more particularly, to rotor sprinklers with both full-circle and part-circle operation.

BACKGROUND

Pop-up irrigation sprinklers are typically buried in the ground and include a stationary housing and a riser that extends from the housing during an irrigation cycle and retracts into the housing between irrigation cycles. During an irrigation cycle, pressurized water causes the riser to elevate through an open upper end of the housing and rise above the ground level to distribute water to surrounding terrain. When the irrigation cycle is completed, the pressurized water supply is shut off and a spring retracts the riser back into the stationary housing.

A rotary irrigation sprinkler commonly includes a rotatable nozzle turret mounted at the upper end of the riser assembly. The turret includes one or more spray nozzles for distributing water and is rotated through an adjustable arcuate water distribution pattern. Rotor sprinklers commonly include a water-driven motor to transfer energy of the incoming water into a source of power to rotate the turret. One common motor uses a water-driven turbine and a gear reduction system to convert the high-speed rotation of the turbine into relatively low speed turret rotation. During normal operation, the turret rotates to distribute water outwardly over surrounding terrain in an arcuate pattern.

Rotary sprinklers may also employ an arc adjustment mechanism to change the relative arcuate distance between two stops that define the limits of rotation for the turret. One stop is commonly fixed with respect to the turret, while another stop can be selectively moved arcuately relative to the turret to increase or decrease the desired arc of coverage. The motor may employ a trip lever that engages the stops and shifts the direction of rotation to oscillate the turret in opposite rotary directions to distribute water over the designated arc defined by the stops.

There are also rotor sprinklers where one can select either part-circle rotation of the turret or full-circle rotation of the turret. In the full-circle rotation, the turret does not oscillate between the stops but rotates continuously in one direction (either clockwise or counterclockwise).

There is a desire to have a rotor sprinkler that operates in both part-circle mode and full-circle mode and that provides improved cycle performance when in the full-circle mode.

DETAILED DESCRIPTION

Figure 1:
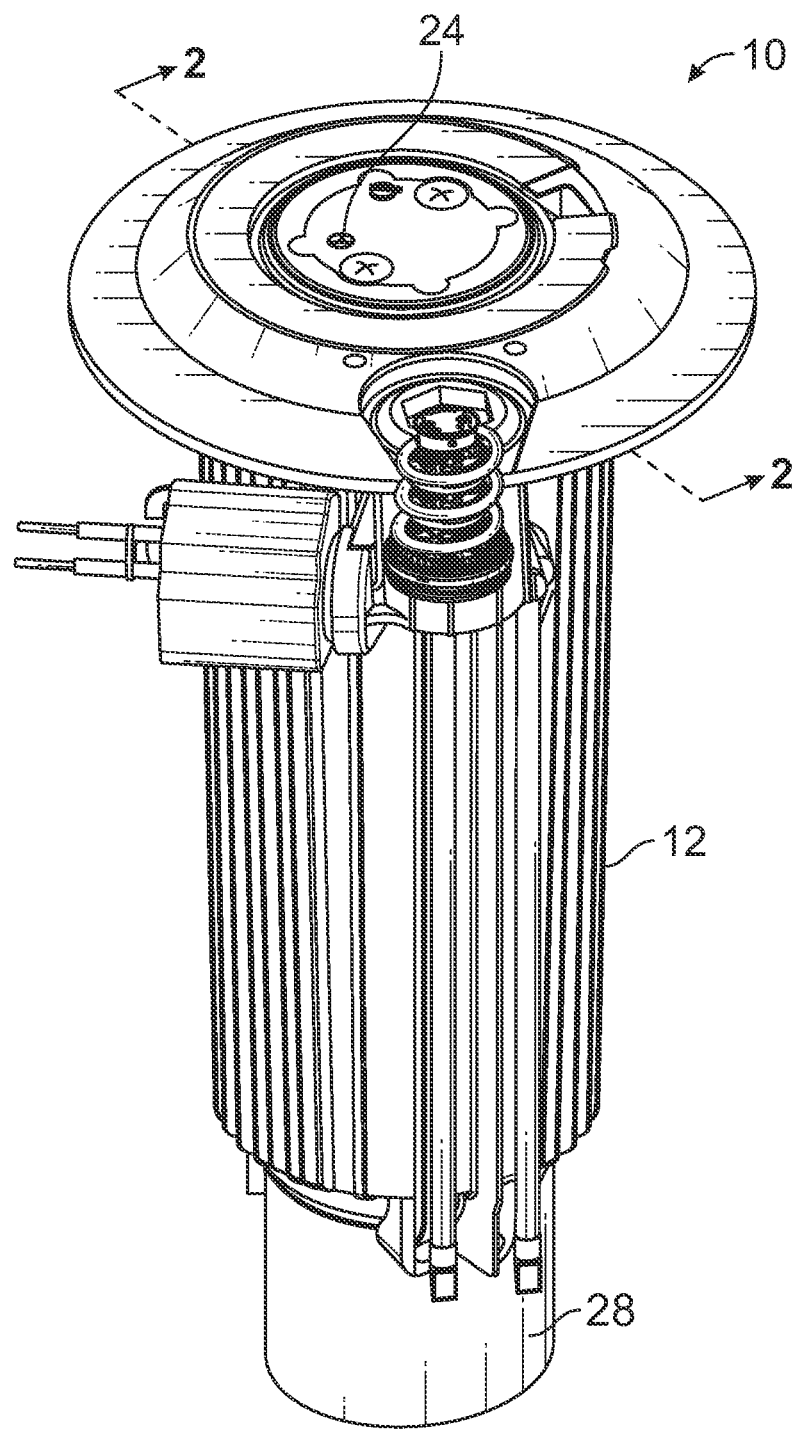
FIG. 1 is a perspective view of an irrigation sprinkler rotor.
Figure 2:
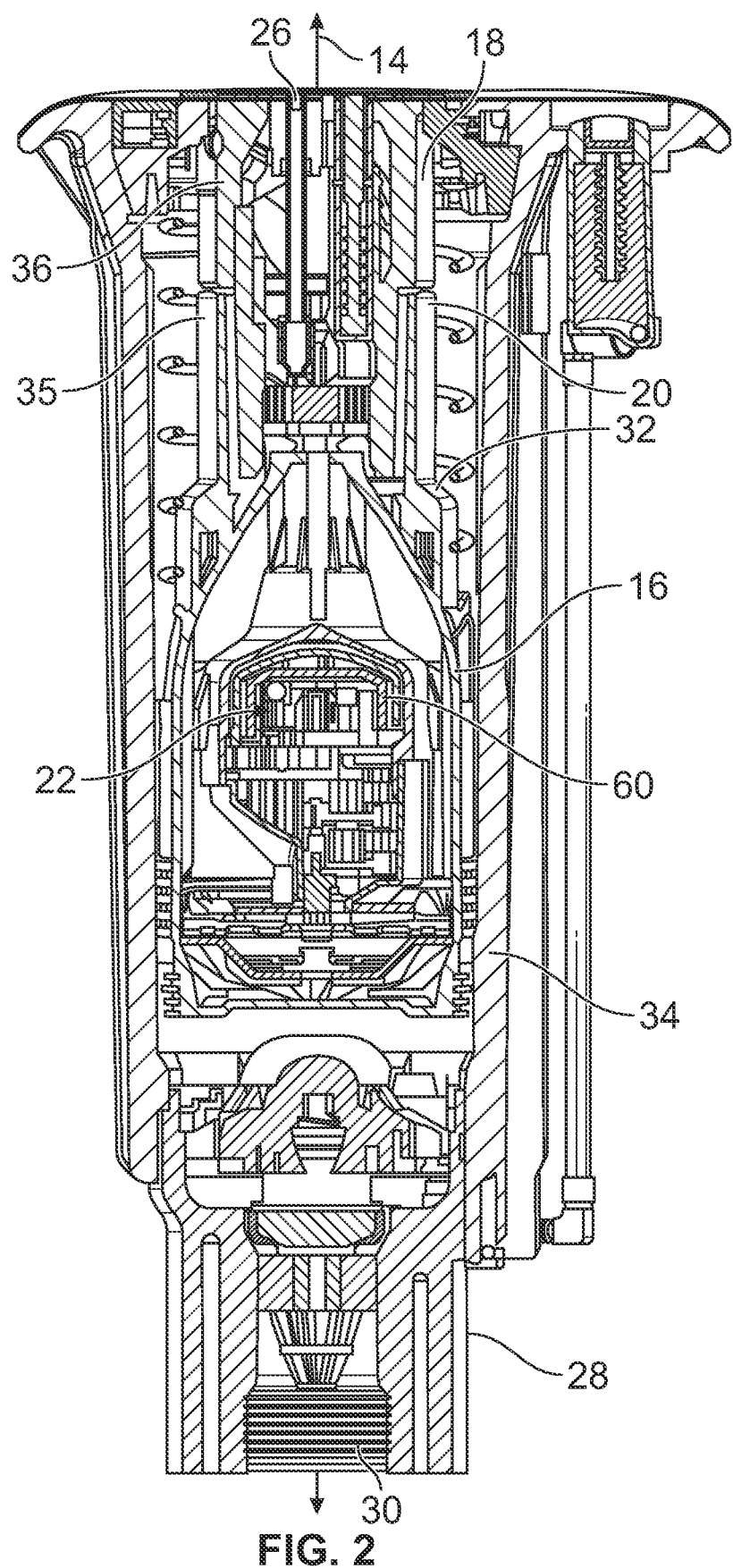
FIG. 2 is a cross-sectional view of the irrigation sprinkler rotor of FIG. 1.

As shown in FIGS. 1 and 2, one embodiment of a rotor type pop-up sprinkler 10 is provided that includes a housing 12 having a longitudinal axis 14, a pop-up riser assembly 16 coupled with the housing 12, and a rotatable nozzle turret 18 on an upper end 20 of the riser assembly 16. In one aspect, the sprinkler 10 includes an arc setting assembly 22 that enables reversing, part-circle operation of the turret 18 and a selector assembly 24 that permits selection of either part-circle operation or full-circle operation of the nozzle turret 18. The components of the selector assembly 24 are generally separate from the components of the arc setting assembly 22.

As described in more detail below, the selector assembly 24 initiates full-circle operation by shifting a trip lever 74, which is used to reverse the direction of rotation of the turret 18, to an operational position that allows the arc setting assembly 22 to bypass the trip lever 74 during full-circle operation and, preferably, to bypass the trip lever 74 completely without any engagement therewith during full-circle operation. When the sprinkler 10 is changed from part-circle operation to full-circle operation, the turret 18 normally rotates continuously in the direction that the turret 18 was last moving in during part-circle operation. For example, if the turret 18 was rotating in the clockwise direction when the selector assembly 24 was shifted from part-circle operation to full-circle operation, the nozzle 18 will continue to rotate in the clockwise direction in full-circle operation. The sprinkler 10, however, includes a feature that ensures that full-circle operation of the turret 18 will be in a preferred rotational direction. For example, if the turret 18 is rotating clockwise when the sprinkler 10 is shifted from part-circle operation to full-circle operation, this feature will quickly change the full-circle operation from the clockwise direction to a counter-clockwise direction. With the sprinkler 10, the counter-clockwise direction is preferred for full-circle operation because the components used for this direction are more durable, as explained further below. Alternatively, the design of the sprinkler could render the clockwise direction to be preferred, so the feature would be positioned to make the opposite shift in direction (i.e., counter-clockwise to clockwise).

In general, the riser assembly 16 travels cyclically between a spring-retracted position where the riser assembly 16 is retracted into the housing 12 (FIG. 2) and an elevated spraying position where the riser assembly 16 extends out of the housing 12 (FIG. 1). The riser assembly 16 includes the rotatable nozzle turret 18 having at least one nozzle 26 for distributing water over a ground surface area. When the supply water is on, the riser assembly 16 extends above ground level so that water can be distributed from the nozzle 26 over the ground surface area for irrigation. When the water is shut off at the end of a watering cycle, the riser assembly 16 retracts into the housing 12 where it is protected from damage.

The housing 12 generally provides a protective covering for the riser assembly 16 and serves as a conduit for incoming water under pressure. The housing 12 preferably has the general shape of a cylindrical tube and is preferably made of a sturdy lightweight injection molded plastic or similar material. The housing 12 has a lower end 28 with an inlet 30 that may be coupled to a water supply pipe.

The riser assembly 16 is non-rotatable and includes an elongated hollow tube or stem 31. The stem 31 includes a lower end 32 and an upper end 34. The turret 18 is rotatably mounted on the upper end 34 of the stem 31. The turret 18 includes a housing 36 that rotates relative to the stem 31 to water a predetermined pattern, which is adjustable from part-circle operation, reversing rotation between a set angle of coverage, to full-circle operation, non-reversing rotation.

The stem 31 is preferably made of a lightweight molded plastic or similar material. The lower end 32 includes a radially projecting annular flange 38. The flange 38 preferably includes a plurality of circumferentially spaced grooves 40 that cooperate with internal ribs 42 of the housing 12 to prevent the stem 31 from rotating relative to the housing 12 when it is extended to the elevated position. A coil spring 44 for retracting the riser assembly 16 back into the housing 12 is disposed in the housing 12 about an outside surface of the stem 31.

Internal to the stem 31, the riser assembly 16 includes a drive mechanism or motor 46, such as a gear-drive assembly having a water-driven turbine 48 that rotates a gear train 50 for turning the turret 18. The gear train 50 may be coupled to a shiftable transmission 52 mounted on a trip plate 54. The transmission 52 preferably has a drive gear 56 rotated via an output of the drive mechanism 46. In this example of the shiftable transmission 52, the drive gear 56 is coupled to opposite terminal gears 58, 59 that rotate in opposite directions. The shiftable transmission 52 is shiftable to engage one of the opposite terminal gears 58 with a ring gear 60 (FIG. 6) mounted for rotation of the turret 18, as generally described in more detail below. Therefore, depending on which terminal gear 58 is engaged with the ring gear 60, the turret 18 rotates in either a clockwise or counter-clockwise direction.

Figure 4:
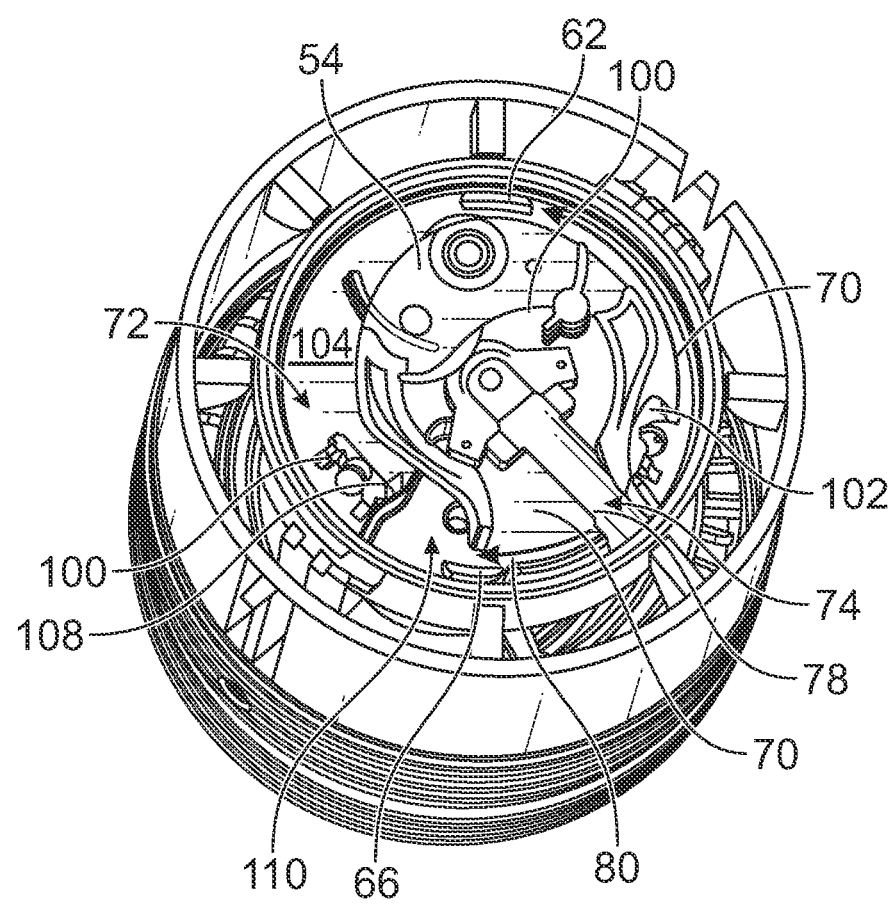
FIG. 4 is a cross-sectional view the riser assembly of the irrigation sprinkler rotor of FIG. 1 showing portions of the selector assembly.
Figure 6:
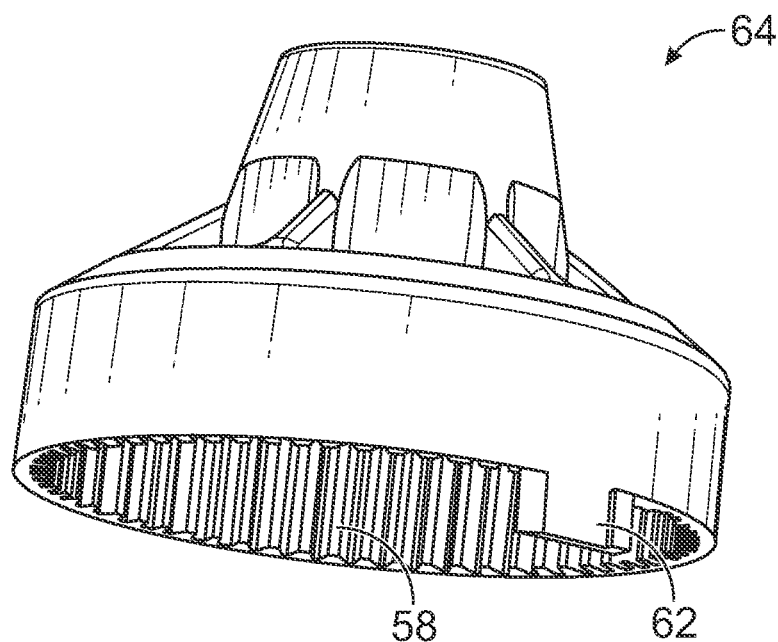
FIG. 6 is a perspective view of a ring gear cup of the selector assembly of the irrigation sprinkler rotor of FIG. 1.

The arc setting assembly 22 allows manual adjustment of the arcuate sweep settings of the turret 18. Referring to FIGS. 4 and 6, one form of the arc setting assembly 20 includes a first arc adjustment or trip stop 62 carried by the ring gear 60. By one approach, the first stop 62 is formed as a downwardly projecting tab extending from a lower end of a cup-shaped driven member 64 having the ring gear 58 on an inner surface thereof. The ring gear 58 is driven by one of the terminal gears 58 (depending on the position of the shiftable transmission 52) and coupled to rotate the turret 18 via the cup-shaped member 64.

Figure 7:
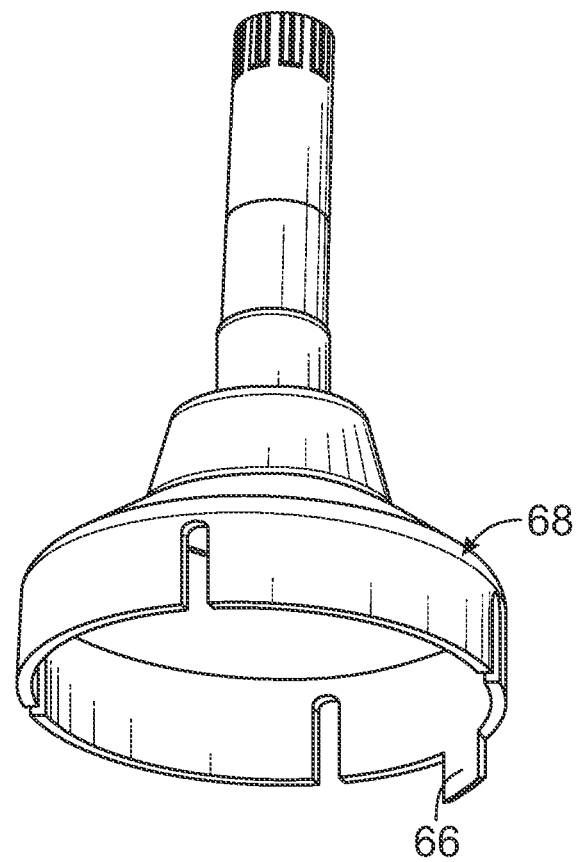
FIG. 7 is a perspective view of an adjustable tab cup of the selector assembly of the irrigation sprinkler rotor of FIG. 1.

With reference to FIGS. 4 and 7, a second arc adjustment or trip stop 66 is formed on a second cup-shaped adjustment member 68 concentrically disposed over the driven member 64 and normally coupled thereto for rotation therewith. By one approach, the second trip stop 66 may be arcuately adjusted to alter the arcuate sweep of the turret 18. The first and second stops 62, 64, therefore, are preferably mounted for rotation with the turret 18 and traverse or travel along an arcuate path 70 in conjunction with the rotation of the turret 18. Preferably, path 70 is an arcuate path relative to the housing body 12 and/or a support plate 72. Depending on the particular settings of the stops 62,64, the length of the path 70 will generally vary.

Figure 5:
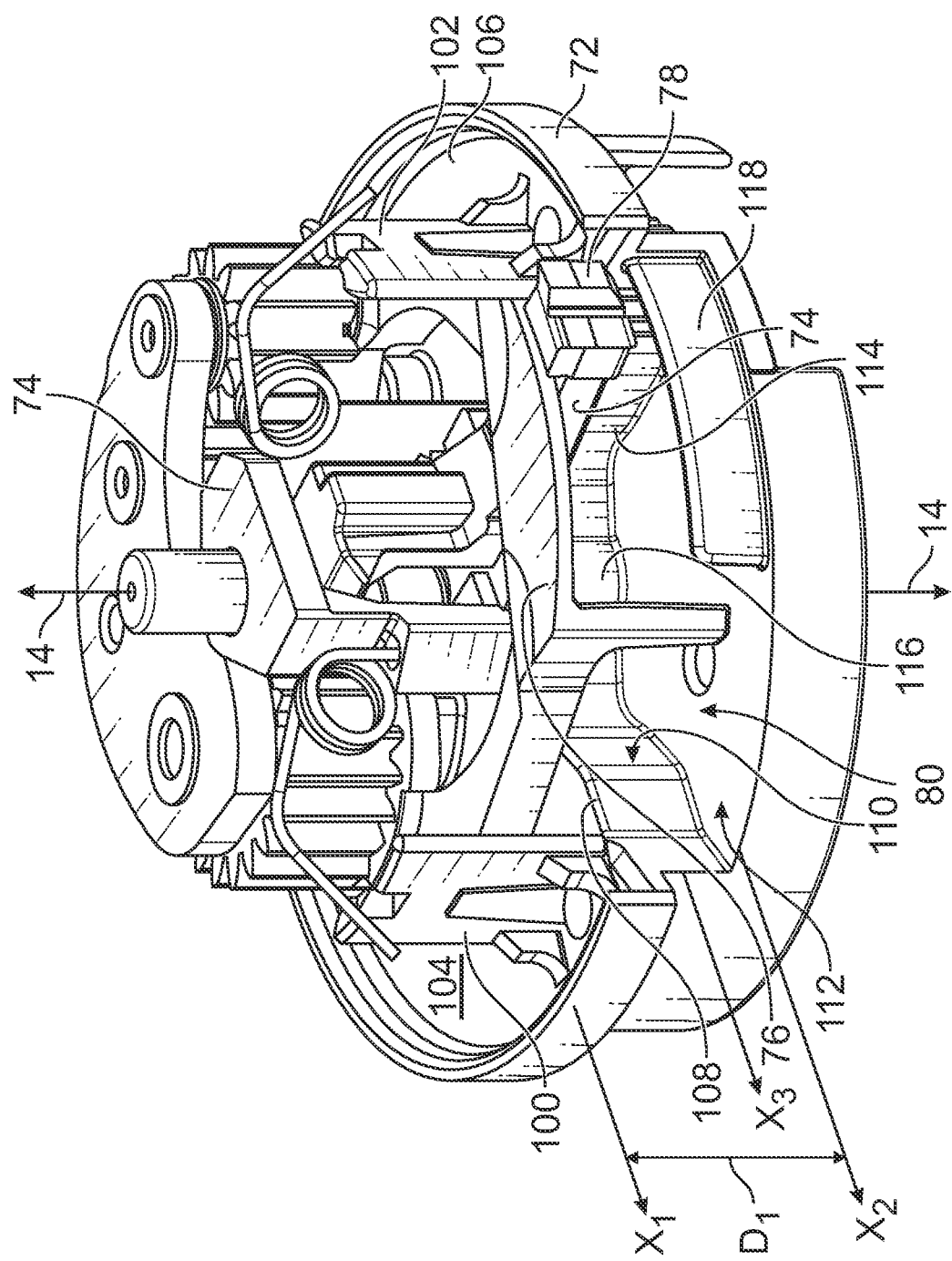
FIG. 5 is a perspective view of portions of the selector assembly of the irrigation sprinkler rotor of FIG. 1.

With reference to FIG. 5, to effect shifting of the shiftable transmission 52 (and reversing operation of the turret 18), a trip member 74, such as a trip arm or trip lever, is coupled to the shiftable transmission 52 via a rocker 76 and operable to shift the shiftable transmission 52 upon being toggled by alternative engagement with the stops 62, 64. The drive gear 56 and the terminal gears 58, 59 are mounted on the trip plate 54.

By one approach, the trip lever 74 may be mounted on the support plate 72 in a first operational position for part-circle operation where at least a portion 78 of the lever 74 is positioned within the path 70 of the stops 62, 64 so that the trip lever 74 can be engaged alternatively by both the first and second stops 62, 64 to effect shifting of the shiftable transmission 52. When the trip lever 74 is toggled by engagement with one of the first and second stops 62, 64, the trip lever 74 causes a corresponding shifting of the trip plate 76 in the same general direction. Because the trip plate 76 is mounted to the shiftable transmission 52, movement of the trip plate 76 causes the shiftable transmission 52 to toggle between engagements of the terminal gears 58, 59 with the ring gear 60.

In this first operational position of the trip lever 74, at least the portion 78 of the trip lever 74 (and in some cases, the entire trip lever itself) generally extends in a first operational plane X1, which is preferably generally transverse to the housing longitudinal axis 14 as generally illustrated in FIG. 5. This first operational plane X1 also encompasses both the first and second stops 62, 64 and the path A of the stops 62, 64. When the trip lever 74 or at least the portion 78 is positioned in this first operational plane X1 and within the path A, as best shown in FIGS. 4 and 5, engagement by one of the first and second stops 62, 64 with the portion 78 toggles the trip lever 74 back and forth to effect shifting of the trip plate 76 and the shiftable transmission 52, which alternates engagement of one of the terminal gears 58, 59 with the ring gear 60 for reversing rotation of the turret 18.

One example of a suitable gear-drive mechanism, shiftable transmission, and arc setting assembly can be found in U.S. Pat. Nos. 5,383,600 and 7,850,094, which are incorporated herein by reference in its entirety and provides further details of these sub-assemblies. It will be appreciated however, that other assemblies, components, and mechanisms that drive, shift, and/or adjust the nozzle turret rotation may also be used to operate the sprinkler 10 in part-circle operation.

To shift between part-circle and full-circle operation, the sprinkler 10 includes the selector assembly 24 that shifts the turret 18 into full-circle operation. To select full-circle operation, the selector assembly 24 preferably does not require adjustment or shifting of the arc setting assembly 22

(including the arc stops 62, 64) and preferably also does not require adjustment or shifting of the shiftable transmission 52 or the drive mechanism 46. As a result, when the sprinkler 10 is shifted back to part-circle operation, the arc set points generally do not need to be reset. By one approach, the selector assembly 24 is coupled to the trip lever 74 to effect such shifting but, at the same time, is also decoupled from the drive mechanism 46.

Figure 9:
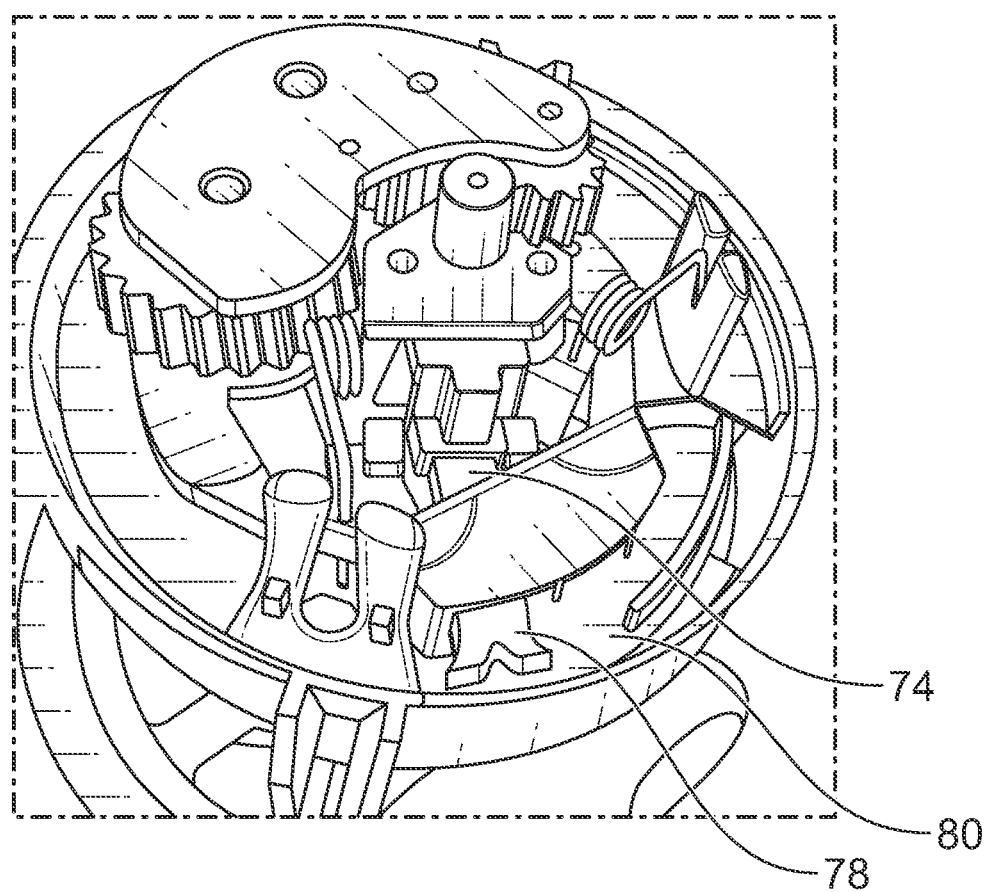
FIG. 9 is a top perspective view of portions of the selector assembly of the irrigation sprinkler rotor of FIG. 1 showing the trip lever in a well.

Turning to FIGS. 5 and 9, the support plate 72 defines a well 80 that cooperates with the switching assembly 24 to shift the trip lever 74 (or portions thereof) to a second operational position where the trip lever 74 (or at least the lever portion 78) is received in the well 80. In this second operational position, the trip lever 74 (or at least the lever portion 78) is in a position where the first stop 62 and the second stop 64 bypass over, without engagement with, the trip lever 74 during operation of the sprinkler 10. That is, the trip lever 74 (or at least the portion 78) is spaced outside the path A of the first and second arc stops 62, 64. Therefore, the turret 18 rotates in only one direction because the first and second stops 62, 64 will not engage the trip lever 74 as they traverse path A. Full-circle operation, as a result, is accomplished without adjustment of the first and second stops 62, 64 or without adjustment of the shiftable transmission 52.

More specifically, when the trip lever 74 (or at least the lever portion 78) is positioned in the second operational position, the trip lever is preferably shifted to a second operational plane X2, which is preferably axially spaced a distance D1 from the first plane X1 and the arc path A. In this second plane X2, the trip lever 74 (or at least the lever portion 78) is positioned axially below the upper surface of the support plate 72 and below the first and second stops 62, 64. As a result, the trip lever 74 or the lever portion 78 is positioned below the path A (i.e., received in the well 80) so that the first and second stops 62, 64 traverse along the path A during normal sprinkler operation and do not contact or otherwise engage the trip lever 74 (or at least lever portion 78). In this setting, the trip lever 70 is not toggled, and the shiftable trans-mission 52 is not shifted so the turret 18 continues to rotate in a single direction.

Figure 8:
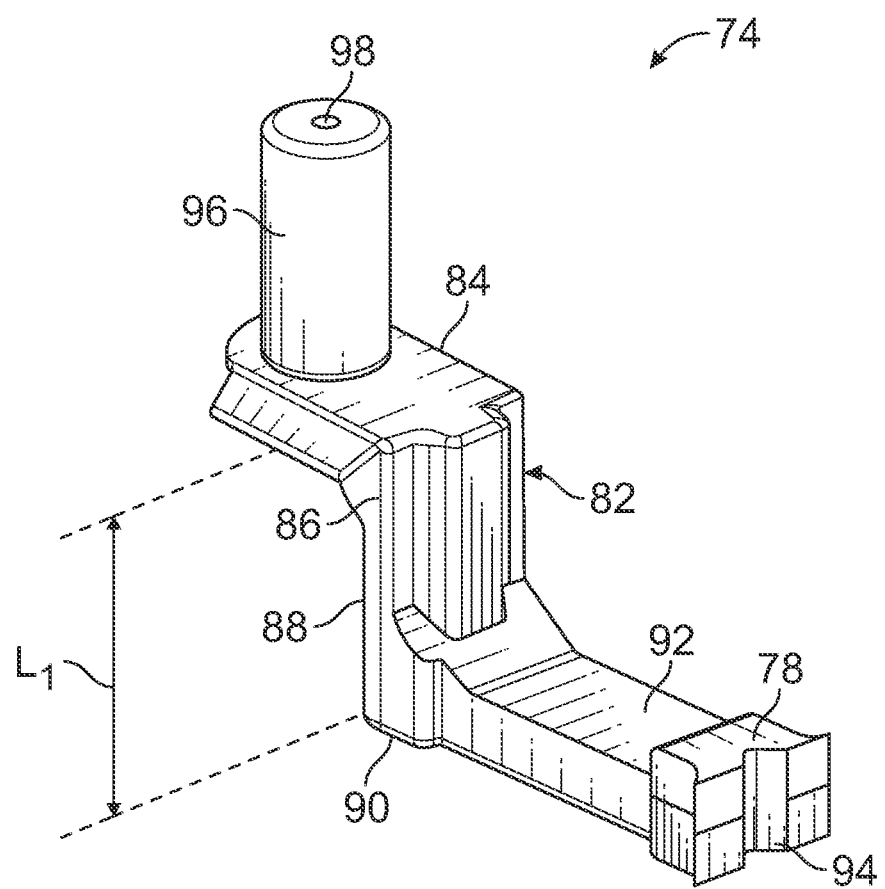
FIG. 8 is a perspective view of a trip lever of the selector assembly of the irrigation sprinkler rotor of FIG. 1.

Referring now to FIG. 8, one form of the trip lever 74 includes a base 82 having an upper longitudinal plate 84. Depending from a distal outer edge 86 of the plate 84 is a depending skirt 88. Extending from a lower end 90 of the skirt 88 is a trip lever extension 92 having one or more of the lever portions 78 (which are engageable with the first and second stops 62, 64) at opposite sides of a distal end 94. When mounted on the support plate 72, the lever base 82 is positioned generally centrally thereon (for instance, about the longitudinal axis 14) with the distal end 94 of the trip lever extension 92 generally at a radial extent of the support plate 72 in a position within the path A to engage the first and second stops 62, 64 when the trip lever 74 is in the first operational position described above. When shifted to the second operational position for full-circle operation, the skirt 88 has an axial length Li that permits the toggle lever extension 92 to be received in the well 80 as the lever base plate 84 is pushed down towards and positioned adjacent to the support plate 72 via the selector assembly 24. In this second operational position at least portions of the trip lever 74 and, preferably, the trip lever extension 92 is positioned outside of the path A and will not be engaged by the first and second stops 62, 64.

Extending upwardly from the longitudinal plate 84 is a mount 96 in the form of an integral tubular extension defining a hollow bore 98, which is positioned to couple the trip lever 74 to the upper components of the selector assembly 24. As with the trip lever described in U.S. Pat. Nos. 5,383,600 and 7,850,094, when the trip lever 74 is configured in the first operational position, the trip lever 74 can be toggled back and forth via engagement with one of the first and stops 62, 64 between upright stop posts 100, 102 (FIGS. 3, 4, and 6) extending upwardly from the support plate 54 to shift the shiftable transmission 52 from a forward to a reverse rotation of the turret 18. The stop posts 100, 102 limit over-toggling of the trip lever 74 and also preferably maintain alignment of the trip lever 74 for ease of receipt in the well 80.

Figure 3:
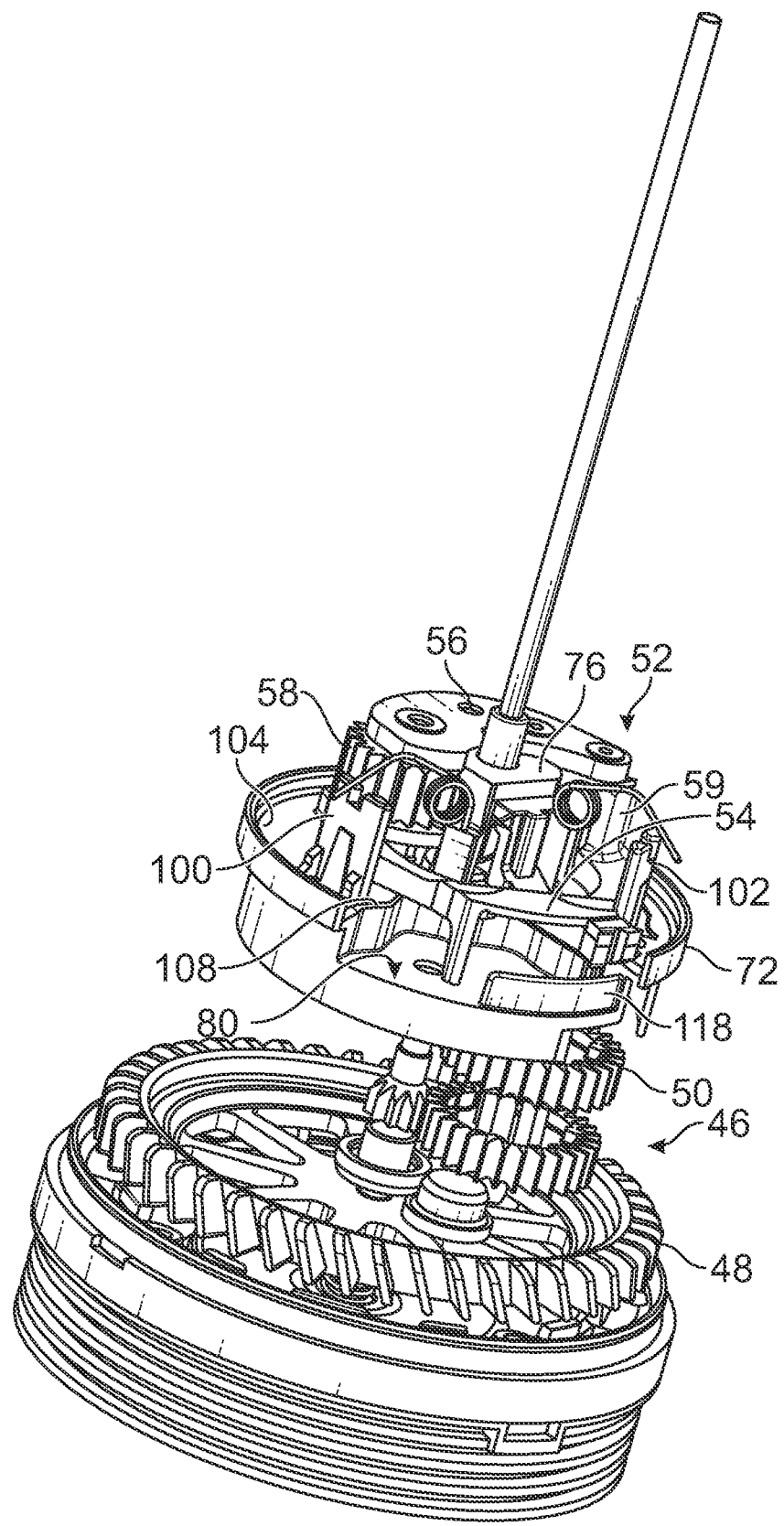
FIG. 3 is a perspective view of a drive motor, transmission, and portions of a selector assembly within the riser assembly of the irrigation sprinkler rotor of FIG. 1.

As best shown in FIGS. 3 and 5, the well 80 may be defined in an upper surface 104 which forms a central base 106 of the support plate 72. The upper surface 104 may include an internal edge 108 defining an opening 110 that leads to the well 80 in an axial direction. In one form, the well 80 may be defined by opposing side walls 112 and 114, a back wall 116 extending downwardly from the upper surface 104, and an arcuate rib 118 (which will be described further herein). The area between the side wall 112 and the arcuate rib 118 forms a discharge opening 112 from the well 80 into the internal cavity of the housing 12, which may in some instances permit discharge of any debris, water, or other obstruction that could accumulate in the well 80. This helps ensure that the trip lever 74 may be freely received in the well 80 without obstruction that could hinder full receipt of the trip lever 74.

Figure 10:
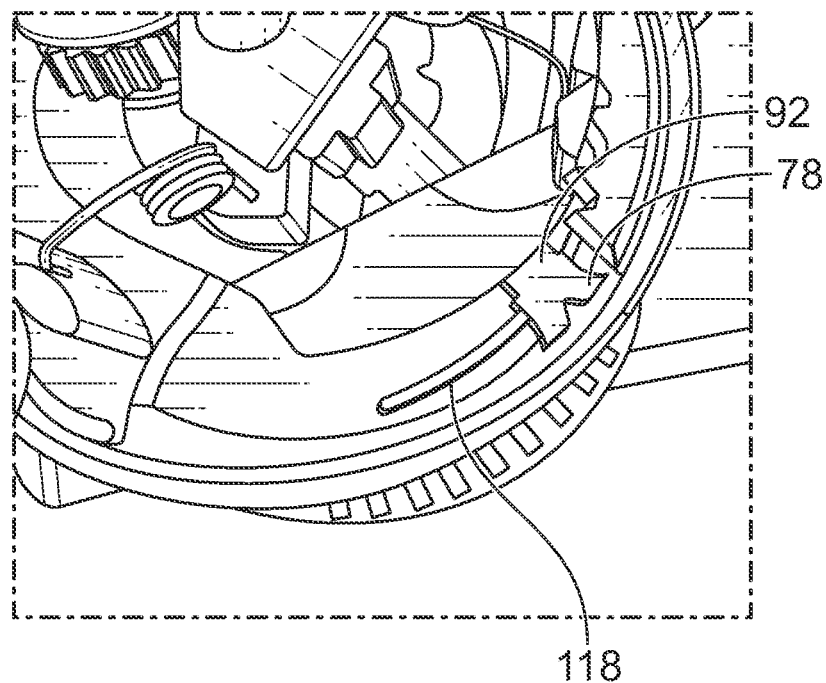
FIG. 10 is a top perspective view of portions of the selector assembly of the irrigation sprinkler rotor of FIG. 1 showing the trip lever on a support feature.
Figure 11:
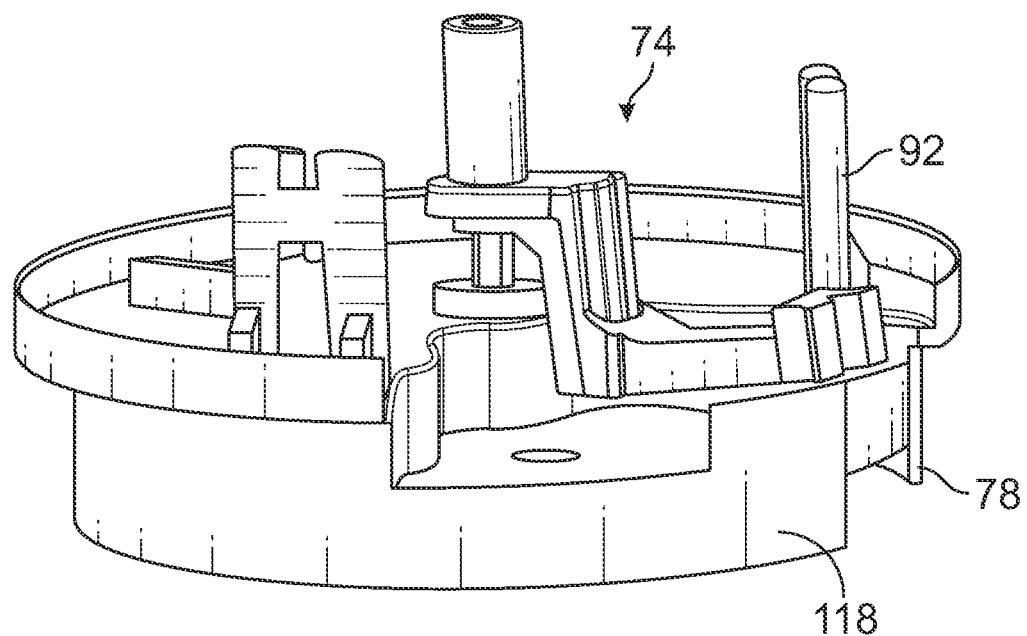
FIG. 11 is another top perspective view of portions of the selector assembly of the irrigation sprinkler rotor of FIG. 1 showing the trip lever on a support feature.

The well 80 also forms an internal cavity of a sufficient size so that the trip lever extension 92 and the end portion 78 of the trip lever 74 may be received in the well 80 when the turret 18 is rotating in the counter-clockwise direction during a shift to full-circle operation (FIG. 9). If the trip lever 74 is toggled so that the nozzle 18 rotates in the clockwise direction when the sprinkler 10 is shifted to full-circle operation, at least the portion 78 of the trip lever 74 will first rest on the arcuate rib 118 (FIGS. 10 and 11) until the stop 62 rotates around in the clockwise direction and moves the trip lever 24 to change the rotation of the turret 18 to the counter-clockwise direction. Then, the trip lever extension 92 and the end portion 78 will fall into the well 80. While being supported on the arcuate rib 118, at least the end portion of the trip lever 74 will be supported in a third plane X3 (FIG. 5). The third plane X3 is intermediate the first plane X1 and the second plane X2. Also, while being supported on the arcuate rib 118, at least the trip lever extension portion 92 may be curved or bent upward from a downward force created on the mount 96 by the selector assembly 24 (FIG. 11). Once moved into the well 80 by the stop 62, the trip lever extension 92 and the end portion 78 will remain there until the sprinkler 10 is shifted to part-circle operation, and the turret 18 will continue to rotate in the counter-clockwise direction. As explained further below, the counter-clockwise direction is preferred to extend the life of the of the shiftable transmission 52. However, the arcuate rib 118 could be positioned in a mirror like fashion so that the clockwise direction could be the preferred direction.

Figure 12:
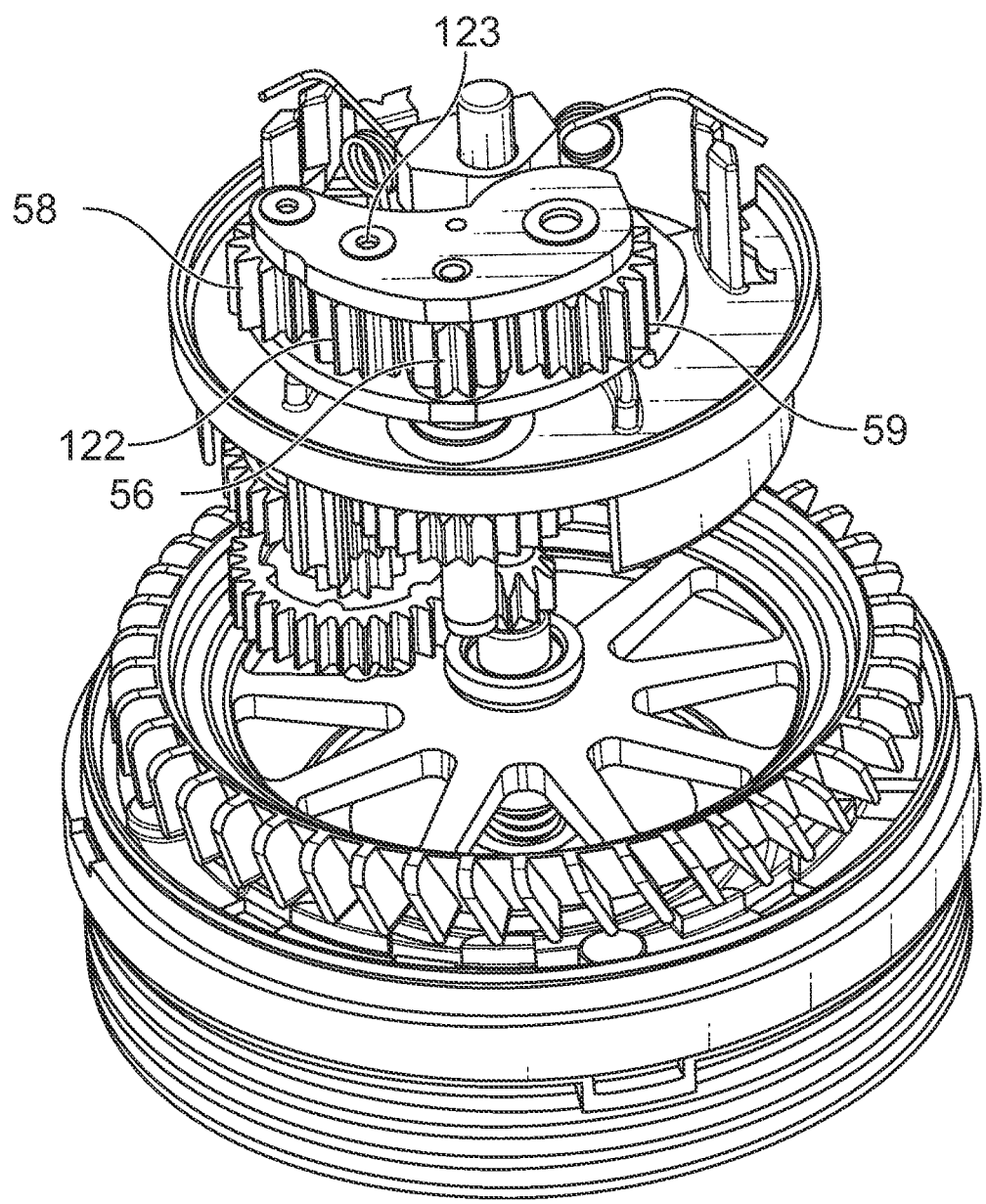
FIG. 12 is a top perspective view of portions of the drive motor and the selector assembly of the irrigation sprinkler rotor of FIG. 1.

As mentioned above, the shiftable transmission 52 includes the drive gear 56 and the opposite terminal gears 58, 59. With reference to FIG. 12, the smaller terminal gear 58 engages and drives the ring gear 60 to rotate the turret 18 in the clockwise direction. An idler gear 122 operates between the drive gear 56 and the smaller terminal gear 58. The idler gear 122 transfers rotation of the drive gear 56 to the smaller terminal gear 58. Not being bound by theory, the idler gear 122 experiences double the tangential reaction forces because of gear loading and higher frequency of loading when compared to the larger terminal gear 59. Hence, a gear post 123 for the idler gear 122 can be subject to relatively early failure when compared to other components of the shiftable transmission 52. The larger terminal gear 59 engages and drives the ring gear 60 to rotate the turret 18 in the counter-clockwise direction. Thus, to enhance the longevity of the sprinkler 10, it is desirable for the turret 18 to rotate in the counter-clockwise direction when in full-circle operation. The arcuate rib 118 ensures that the shiftable transmission 52 is quickly moved to rotating the turret 18 in the counter-clockwise direction after being shifted to full-circle operation.

Rotating in the counter-clockwise direction provides increased rotational life of the sprinkler 10 in full-circle operation by eliminating early failure of the idler gear 122 and idler gear post 123. When operating in the counter-clockwise direction, the idler gear 122 spins freely with no loading. Conversely, when operating in the clockwise direction, forces acting on the idler gear 122 pull the idler gear 122 toward the axis 14, which loads the idler post 123. Further, always operating in the counter-clockwise direction when in full-circle operation adds consistency of rotation.

Figure 13:
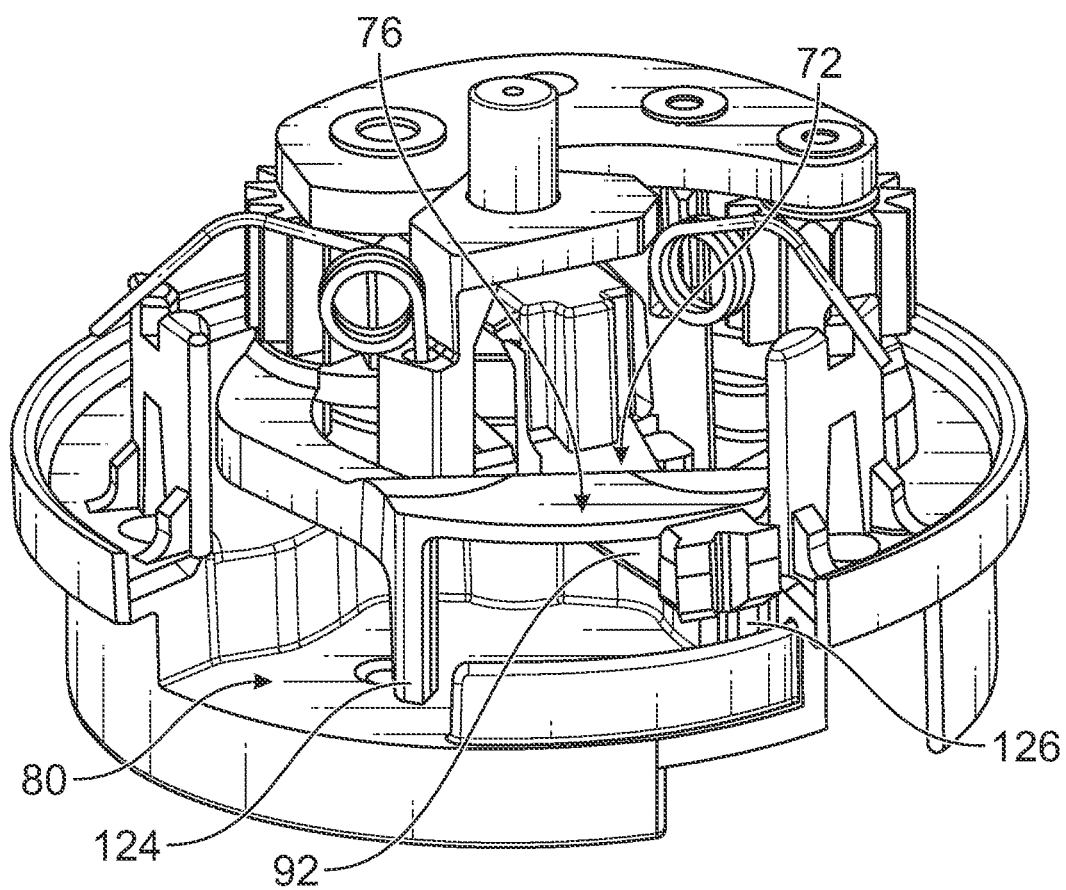
FIG. 13 is a top perspective view of portions of the selector assembly of the irrigation sprinkler rotor of FIG. 1.

Referring to FIG. 13, the trip plate 76 helps smoothly direct or guide the trip lever 74 between part-circle position and full-circle position. The trip plate 76 includes a pair of generally parallel-oriented fingers 124, 126 that extend from the trip plate 76 into the well 80. The fingers 124, 126 have an axial length that extends between the first operational plane X1 and the second operational plane X2 to guide the trip lever 74 therebetween. As shown, the trip lever extension 92 extends radially into a space between the fingers 124, 126 and is operable to toggle back and forth within this space by the first and second stops 62, 64. The fingers 124, 126 preferably extend a sufficient distance into the well 80 so that the trip lever extension 92 remains received between the arms 124, 126 when the trip lever 74 is shifted to the full-circle position. To this end, the fingers 124,126 preferably extend close to or even lightly engage the lower surface of the well 80. This configuration is advantageous because it prevents the trip lever extension 92 from being wedged under the trip plate 76 or slide outside of the trip plate 76 when the trip lever 74 is shifted back to the part-circle position.

Figure 14:
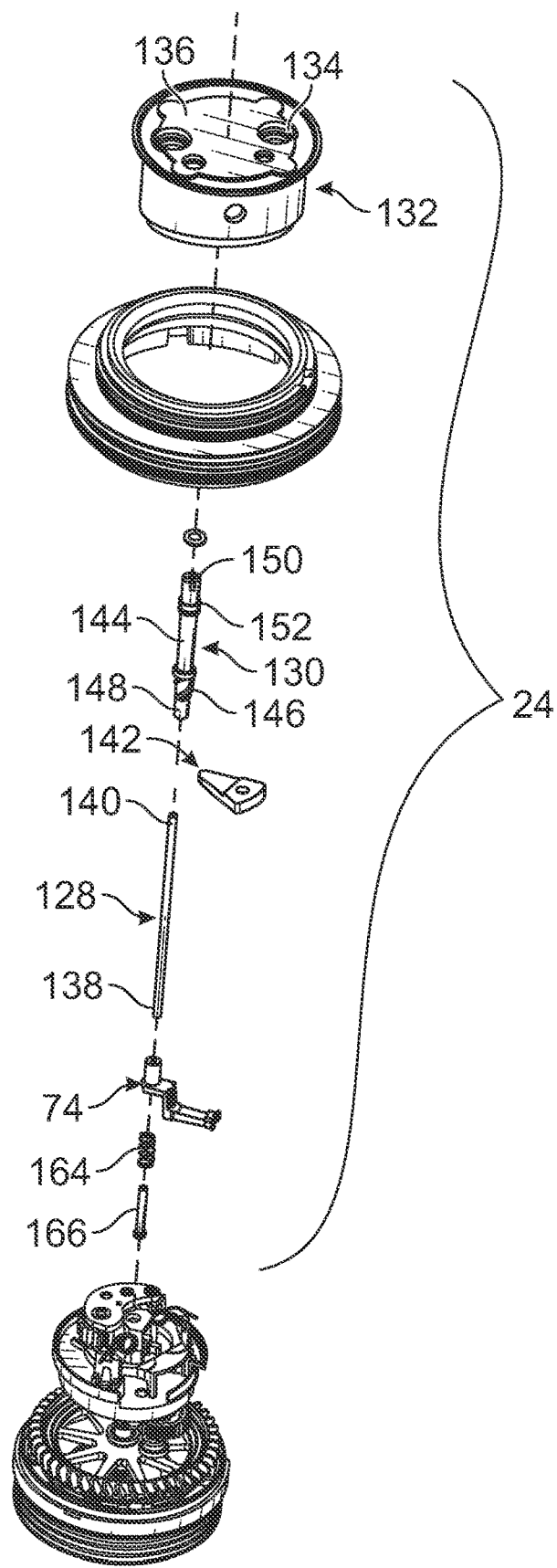
FIG. 14 is an exploded view of portions of the riser assembly of the irrigation sprinkler rotor of FIG. 1 showing portions of the selector assembly.
Figure 15:
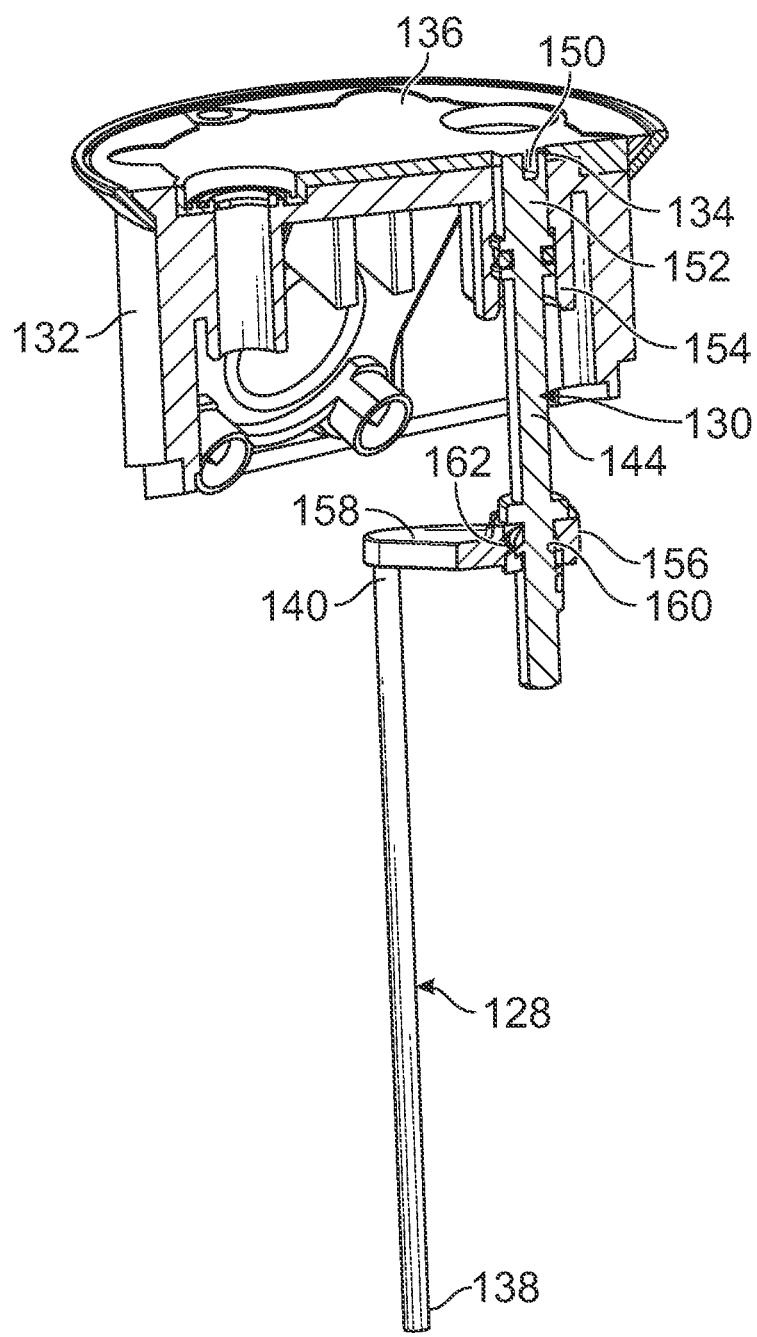
FIG. 15 is a cross-sectional view of the turret of the irrigation sprinkler rotor of FIG. 1 to illustrate portions of the selector assembly.
Figure 16:
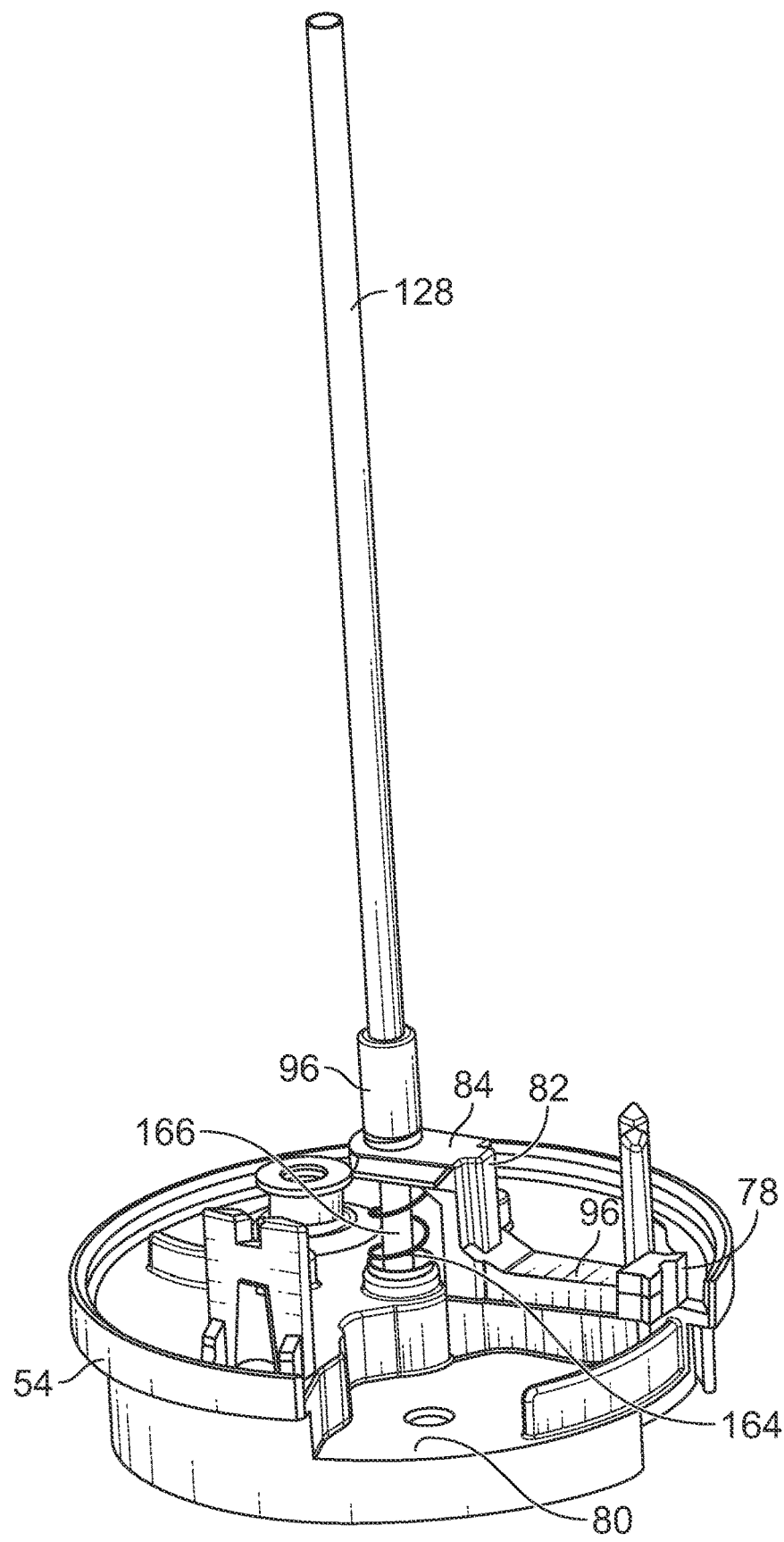
FIG. 16 is a top perspective view of portions of the selector assembly of the irrigation sprinkler rotor of FIG. 1.

Turning now to FIGS. 14-16, for shifting the trip lever 74 from the part-circle position to the full-circle position, the selector assembly 24 is linked to the trip lever 74. The selector assembly 24 includes a connecting rod 128 that is configured to be shifted via a user accessible actuator 130 where adjustment of the actuator 130 shifts the trip lever 74 in an axial direction from the first operation position for part-circle operation to the second operational position received in the well 80 for full-circle operation. The actuator 130 is positioned in an upper cap 132 of turret 18 for adjustment from a user. Preferably, the actuator 130 is exposed through an aperture 134 in an upper surface 136 of the cap 132. The connecting rod 128 is coupled to and transmits the adjustment from the actuator 130 to the trip lever 74. To this end, a lower end 138 of the rod 128 engages the mount 96 of the trip lever 74, and an upper end 140 of the rod 128 is engaged to or abuts a cross-linkage 142 that couples the rod 128 to the actuator 130. The connecting rod 128 is mounted for sliding in an axial direction along the longitudinal axis 14. As a result, the connecting rod 128 transmits the adjustment from the actuator 130 to the trip lever 74 and shifts the trip lever 74 along the longitudinal axis 14. There is a rotational interface between the upper end 140 of the connecting rod 128 and the cross-linkage 142 so that the cross-linkage 142 can travel or orbit along with the turret 18, but the actuator 130 and the cross-linkage 142 are otherwise not directly driven by the drive mechanism 46 because they are free to rotate about the rod end 140.

More specifically, the actuator 130 is preferably in the form of a jack screw 144 having external threading 146 on at least a lower portion 148. A top of the jack screw 144 may include a slot 150 or other profile 150 configured to receive a screwdriver or other tool to turn the jack screw 144 to shift the trip lever 74 from the first operational position to the second operational position. An upper portion 152 of the jack screw 144 is mounted for rotation in the cap 132, such as received in a cylindrical coupling 154 configured to permit the jack screw 144 to rotate but, preferably, retain the jack screw 144 in its axial position so that turning of the jack screw 144 does not shift it axially.

The cross-linkage 142 includes a nut portion 156 extending from a plate 158 that interfaces with the upper end 140 of the connecting rod 128. The nut portion 156 defines a passage 160 having internal threading 162 mating with the external threading 146 of the jack screw 144 so that, when the jack screw 144 is turned by a user, the mated internal and external threading 162, 146, respectively, imparts motion along the longitudinal axis 14 to the cross-linkage 142. Thus, the cross-linkage 142 pushes the connecting rod 128 and results in a corresponding motion of the connecting rod 128 along the longitudinal axis 14. Such axial motion of the connecting rod 128 shifts the trip lever 74 into the well 80 from the first operational position to the second operational position.

For example, to shift the sprinkler 10 to full-circle operation, a user turns the jack screw 144 to push the connecting rod 128 along the longitudinal axis 14 to shift the trip lever extension 92 into the well 80. To shift the sprinkler 10 back to part-circle operation, the user turns the jack screw 144 in the opposite direction to allow the cross-linkage 142 and the connecting rod 128 to move in an opposite direction along the longitudinal axis 14. As a result, the trip lever extension 92 moves out of the well. Preferably, the selector assembly 24 also includes a biasing member 164 that biases the trip lever 74 and the connecting shaft 128 to the part-circle position as the cross-linkage 142 is allowed to move by the actuator 130.

The biasing member 164 of the selector assembly 24 assists in shifting the trip lever 74 out of the well 80 as the user turns the jack screw 144. The biasing member 164 may be in the form of a coil spring positioned to provide a biasing force to a bottom of the base plate 84 to urge the trip lever 74 out of the well 80. A centering post 166 maintains and guides the biasing member 164. The biasing member 164, such as the coil spring, spirals around the centering post 166 to align the coil spring on the bottom of the plate 84. When the trip lever 74 (or at least a portion thereof) is shifted to the second operational position into the well 80 for full-circle operation, the selector assembly 24 provides a downward force to counter-bias or compress the biasing member 164 as needed for the trip lever extension 92 to be moved into the well 80. Conversely, when the selector assembly 24 allows the cross-linkage 142 to move away from the well 80, the biasing member 164 urges the trip lever 74 along the longitudinal axis 14 away from the well 80 to shift the trip lever 74 out of the well 80. In this exemplary configuration, the biasing member 164 urges or permits the trip lever 74 to default to the part-circle operational position (assuming the actuator 130 and cross-linkage 142 have not shifted the trip lever 74 to the full-circle operational position).

It will be understood that various changes in the details, materials, and arrangements of parts and components which have been herein described and illustrated to explain the nature of the sprinkler may be made by those skilled in the art within the principle and scope of the sprinkler as expressed in the appended claims. Furthermore, while various features have been described with regard to a particular embodiment, it will be appreciated that features described for one embodiment may also be incorporated with the other described embodiments.

What is claimed is:

1. An irrigation sprinkler rotor having a full-circle mode and a part-circle mode comprising:
   a housing;
   a riser movable between a retracted position and an elevated position relative to the housing and having a longitudinal axis;
   a turret mounted for rotation relative to the riser;
   a turbine-driven motor rotating the turret in a full-circle mode and a part-circle mode;
   at least a pair of arc stops disposed in a first operational plane relative to the longitudinal axis and mounted for movement with the turret;
   a shiftable transmission powered by the turbine-driven motor and operable to oscillate the turret in the part-circle mode between the at least a pair of arc stops;
   a trip lever arranged to be shifted in an axial direction from the first operational plane to a second operational plane, the second operational plane spaced an axial distance from the first operational plane;
   when the trip lever is positioned in the first operational plane, the trip lever is shifted by the at least a pair of arc stops to shift the transmission to oscillate the turret between a clockwise direction and a counter-clockwise direction in the part-circle mode;
   when the trip lever is positioned in the second operational plane, the at least a pair of arc stops bypass the trip lever for rotation of the turret in the full-circle mode;
   when in full-circle mode the turret rotates only in one of the clockwise direction or the counter-clockwise direction; and
   a third operational plane intermediate the first operational plane and the second operational plane, at least a first portion of the trip lever positioned in the third operational plane during transition from the first operational plane to the second operational plane until being moved rotationally by one of the at least a pair of arc stops.

2. The irrigation sprinkler rotor of claim 1 further comprising a support temporarily holding the trip lever in the third operational plane until being moved rotationally by one of the at least a pair of arc stops.

3. The irrigation sprinkler rotor of claim 2, wherein the support comprises an arcuate rib.

4. The irrigation sprinkler rotor of claim 2, wherein at least a second portion of the trip lever becomes curved when the trip lever engages the support.

5. An irrigation sprinkler rotor having a full-circle mode and a part-circle mode comprising:
   a housing;
   a riser movable between a retracted position and an elevated position relative to the housing and having a longitudinal axis;
   a turret mounted for rotation relative to the riser;
   a turbine-driven motor rotating the turret in a full-circle mode and a part-circle mode;
   at least a pair of arc stops disposed in a first operational plane relative to the longitudinal axis and mounted for movement with the turret;
   a shiftable transmission powered by the turbine-driven motor and operable to oscillate the turret in the part-circle mode between the at least a pair of arc stops;
   a trip lever arranged to be shifted in an axial direction from the first operational plane to a second operational plane, the second operational plane spaced an axial distance from the first operational plane;
   when the trip lever is positioned in the first operational plane, the trip lever is shifted by the at least a pair of arc stops to shift the transmission to oscillate the turret between a clockwise direction and a counter-clockwise direction in the part-circle mode; and
   when the trip lever is positioned in the second operational plane, the at least a pair of arc stops bypass the trip lever for rotation of the turret in the full-circle mode;
   when in full-circle mode the turret rotates only in one of the clockwise direction or the counter-clockwise direction;
   wherein the turret rotates in the counter-clockwise direction in the full-circle mode;
   wherein when the turret is set to rotate in the clockwise direction when being shifted from the part-circle mode to the full-circle mode the trip lever moves from the first operational plane to a third operational plan until one of the at least a pair of stops moves the trip lever to shift the transmission to the counter-clockwise direction at which time the trip lever moves to the second operational plane.

6. The irrigation sprinkler rotor of claim 5, wherein when the turret is set to rotate in the counter-clockwise direction when being shifted from the part-circle mode to the full-circle mode the trip lever moves directly from the first operational plane to the second operational plane.

7. The irrigation sprinkler rotor of claim 5 further comprising a support temporarily holding the trip lever in the third operational plane until being moved rotationally by one of the at least a pair of arcuate arc stops.

8. An irrigation sprinkler rotor having a full-circle mode and a part-circle mode comprising:
   a housing;
   a riser movable between a retracted position and an elevated position relative to the housing and having a longitudinal axis;
   a turret mounted for rotation relative to the riser;
   a turbine-driven motor rotating the turret in a full-circle mode and a part-circle mode;
   at least a pair of arc stops disposed in a first operational plane relative to the longitudinal axis and mounted for movement with the turret;
   a shiftable transmission powered by the turbine-driven motor and operable to oscillate the turret in the part-circle mode between the at least a pair of arc stops;
   a trip lever arranged to be shifted in an axial direction from the first operational plane to a second operational plane, the second operational plane spaced an axial distance from the first operational plane;
   when the trip lever is positioned in the first operational plane, the trip lever is shifted by the at least a pair of arc stops to shift the transmission to oscillate the turret between a clockwise direction and a counter-clockwise direction in the part-circle mode; and when the trip lever is positioned in the second operational plane, the at least a pair of arc stops bypass the trip lever for rotation of the turret in the full-circle mode;

when in full-circle mode the turret rotates only in one of the clockwise direction or the counter-clockwise direction, wherein the turret rotates in the counter-clockwise direction in the full-circle mode, wherein when the turret is set to rotate in the clockwise direction when being shifted from the part-circle mode to the full-circle mode the trip lever moves directly from the first operational plane to the second operational plane;

wherein when the turret is set to rotate in the counter-clockwise direction when being shifted from the part-circle mode to the full-circle mode the trip lever moves from the first operational plane to a third operational plan until one of the at least a pair of stops moves the trip lever to shift the transmission to the clockwise direction at which time the trip lever moves to the second operational plane.

9. The irrigation sprinkler rotor of claim 8 further comprising a support temporarily holding the trip lever in the third operational plane until being moved rotationally by one of the at least a pair of arc stops.

10. The irrigation sprinkler rotor of claim 2, further comprising a support plate having an upper surface for supporting at least the trip lever, the support plate defining an opening through the upper surface, and the first operational plane positioned on one side of the support plate upper surface and the second operational plane below the support plate upper surface.

11. The irrigation sprinkler rotor of claim 10, wherein the support projects from the second operational plane towards the first operational plane.

12. The irrigation sprinkler rotor of claim 10, wherein the support plate includes walls defining a well and the trip lever received in the well when in the second operational plane.

13. The irrigation sprinkler rotor of claim 1, further comprising an actuator coupled to the trip lever, the actuator configured for axial shifting of the trip lever from the first operational plane to the second operational plane.

* * * * *

UNITED STATES PATENT AND TRADEMARK OFFICE
CERTIFICATE OF CORRECTION

PATENT NO. : 12,434,252 B2
APPLICATION NO. : 17/724993
DATED : October 7, 2025
INVENTOR(S) : Mateusz Grzegorz Kruzel Page 1 of 1

It is certified that error appears in the above-identified patent and that said Letters Patent is hereby corrected as shown below:

In the Claims

Column 10, Line 40, in Claim 7, Line 4, delete "arcuate".

Signed and Sealed this
Eleventh Day of November, 2025

John A. Squires
*Director of the United States Patent and Trademark Office*